United States Patent
Kwon et al.

(10) Patent No.: US 9,565,289 B2
(45) Date of Patent: Feb. 7, 2017

(54) MOBILE TERMINAL AND METHOD OF CONTROLLING THE SAME

(71) Applicant: LG ELECTRONICS INC., Seoul (KR)

(72) Inventors: Yunmi Kwon, Seoul (KR); Arim Kwon, Seoul (KR); Jiyoung Park, Seoul (KR); Hyungtae Jang, Seoul (KR); Hyemi Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 154 days.

(21) Appl. No.: 14/325,200

(22) Filed: Jul. 7, 2014

(65) Prior Publication Data

US 2015/0024715 A1    Jan. 22, 2015

(30) Foreign Application Priority Data

Jul. 17, 2013  (KR) ........................ 10-2013-0084290

(51) Int. Cl.
- *H04M 1/725* (2006.01)
- *H04M 1/64* (2006.01)
- *H04M 1/57* (2006.01)

(52) U.S. Cl.
CPC ........... *H04M 1/72547* (2013.01); *H04M 1/64* (2013.01); *H04M 1/72519* (2013.01); *H04M 1/575* (2013.01)

(58) Field of Classification Search
CPC .............................. H04W 76/02; H04M 1/64
USPC ..... 455/466, 567, 67.7, 412.1, 414.4, 556.1, 455/414.2; 348/14.02; 704/236
See application file for complete search history.

(56) References Cited

U.S. PATENT DOCUMENTS

| | | | |
|---|---|---|---|
| 6,424,828 B1* | 7/2002 | Collins | H04L 51/066 379/9.01 |
| 2009/0042589 A1 | 2/2009 | Park et al. | |
| 2011/0014932 A1* | 1/2011 | Estevez | G01S 19/14 455/466 |
| 2011/0093793 A1* | 4/2011 | Ryu | H04M 1/72547 715/752 |
| 2012/0300914 A1* | 11/2012 | Baccay | H04M 1/575 379/88.12 |

FOREIGN PATENT DOCUMENTS

| | | |
|---|---|---|
| EP | 1592201 | 11/2005 |
| WO | 2007/037155 | 4/2007 |
| WO | 2010/145257 | 12/2010 |

OTHER PUBLICATIONS

European Patent Office Application Serial No. 14177070.1, Search Report dated Dec. 18, 2014, 6 pages.

* cited by examiner

*Primary Examiner* — Kiet Doan
(74) *Attorney, Agent, or Firm* — Lee, Hong, Degerman, Kang & Waimey PC

(57) ABSTRACT

Disclosed herein is a mobile terminal. The mobile terminal includes a wireless communication unit configured to perform a communication function with an external device, information acquisition means, and a controller configured to generate a call reception request message when a call transmission request is received, send the generated call reception request message to a called device, generate a preliminary message based on information obtained through the information acquisition means before a call is connected to the called device after receiving the call transmission request, and send the generated preliminary message to the called device.

16 Claims, 39 Drawing Sheets

| Sharing |
|---|
| U+Box |
| NaverBlog |
| NateOn |
| Line |
| Message |
| E-mail |

UI for counterpart A (b) 151G2

| Sharing |
|---|
| U+Box |
| NaverBlog |
| NateOn |
| Line |

UI for counterpart B (c) 151G3

| Sharing |
|---|
| U+Box |
| NaverBlog |
| NateOn |
| Wi-Fi |
| Bluetooth |
| Message |
| E-mail |

UI for counterpart C

FIG. 29
(a) Obtain the voice of a user
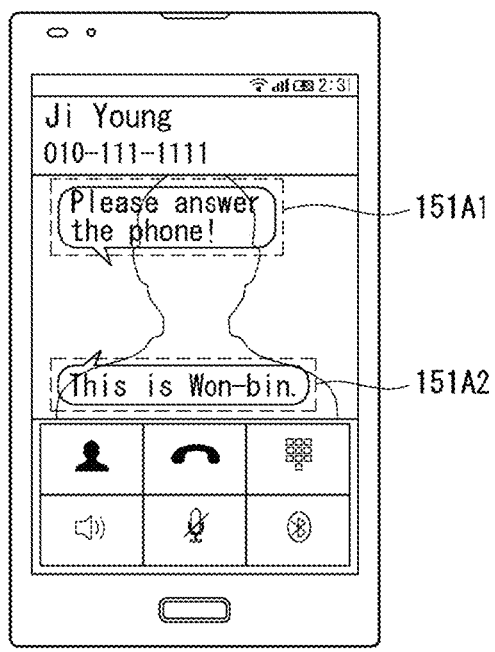
(b) Display preliminary message in a speech bubble form Send preliminary message and send
call reception request message Send preliminary message and
calling preliminary message reception
request message after writi (a) Calling terminal   (b) Called terminal

MOBILE TERMINAL AND METHOD OF CONTROLLING THE SAME

Pursuant to 35 U.S.C. §119(a), this application claims the benefit of earlier filing date and right of priority to Korean Patent Application No. 10-2013-0084290, filed on 17 Jul. 2013, the contents of which are incorporated by reference herein in their entirety.

BACKGROUND OF THE INVENTION

Field of the Invention

The present invention relates to a mobile terminal and, more particularly, to a mobile terminal which is capable of generating a preliminary message using the voice or image of a user obtained before a call is connected and sending the generated preliminary message to a called terminal.

Discussion of the Related Art

As the functions of a terminal, such as a personal computer, a laptop computer, a mobile phone, or a smart phone, are diversified, the terminal has been implemented in the form of a multimedia player equipped with complex functions, such as the photographing of photos or moving images, the playback of music or video files, gaming, and the reception of broadcasting.

In order to support and increase the functions of the terminal, the improvement of the structural parts and/or software parts of the terminal may be taken into consideration. Recently, various terminals including a mobile terminal have complicated menu structures as they provide complex and various functions.

Such a mobile terminal is equipped with a wireless communication function, but a calling terminal is unable to perform data communication with a called device before a call is connected after the mobile terminal executes a phone application.

SUMMARY OF THE INVENTION

An object of the present invention is to provide a mobile terminal which is capable of generating a preliminary message using the voice or image of a user obtained before a call is connected after the call is sent and sending the generated preliminary message to a called terminal before the call is connected.

Another object of the present invention is to provide a mobile terminal which is capable of sending a preliminary message, generated before a call is connected after the call is sent, using a data section assigned to an early media session.

Yet another object of the present invention is to provide a mobile terminal which is capable of generating a preliminary message before a call is connected and sending the generated preliminary message to a called device, wherein a time interval during which information for generating the preliminary message is obtained and a method of sending the preliminary message to the called device are differently set by taking into consideration the operating state of the called device.

Further yet another object of the present invention is to provide a mobile terminal which is capable of providing a user interface for previously generating a preliminary message that will be transmitted to a called device before a call is connected.

Object to be achieved by the present invention are not limited to the aforementioned objects, and those skilled in the art to which the present invention pertains may clearly understand other objects that have not been described from the following description.

A mobile terminal according to an aspect of the present invention may include a wireless communication unit configured to communicate with an external device, an input unit, and a controller.

The controller may generate a call reception request message in response to a call transmission command, may send the generated call reception request message to the external device via the wireless communication unit, may generate a preliminary message comprising information captured via the input unit before a call related to the call reception request message is connected with the external device, and may send the generated preliminary message to the external device via the wireless communication unit.

The controller may send the preliminary message using a data section assigned to an early media session established before the call is connected.

The input unit may comprise a microphone configured to capture audio information and the preliminary message may comprise a voice message related to the audio information or a text message comprising words recognized in the voice message, the input unit may comprise a keyboard configured to receive text input and the preliminary message may comprise a text message received via the keyboard or the input unit may comprise a camera configured to capture images and the preliminary message may comprise an image captured by the camera captured.

The mobile terminal may further include a display module. In this case, the controller may cause the display to display a user interface for selecting an application for sending the preliminary message when the call is not connected.

The controller may cause the display to display an application list comprising applications each executed in response to a selection input and may change the applications displayed in the application list based on information associated with the external device.

The controller may send the preliminary message to the external device using a specific application when the call is not connected.

The controller may generate information for generating the preliminary message when audio related to a voice of a user is received via the input unit, a word is recognized in the received audio or a specific manipulation is received via the input unit.

The controller may reduce a size of the generated preliminary message to be smaller than a size of the data section assigned to the early media session, and may send the reduced size preliminary message to the external device via the wireless communication unit.

The controller may change a size of text of the text message based on a volume of the voice message related to the captured audio information.

The controller may select an image stored in a memory based on content of the text message and may generate a preliminary message comprising the text message and the selected image.

The controller may include the preliminary message sent to the external device in a call history log associated with the external device.

A mobile terminal according to another aspect of the present invention may include a wireless communication unit configured to communicate with an external device, an input unit, and a controller.

The controller may generate a call reception request message in response to receiving a call transmission command, may send the generated call reception request message to the external device via the wireless communication unit, may determine an operating state of the external device based on a response message received in response to the sent call reception request message, may cause the input unit to capture input information for a specific time duration and may generate a preliminary message comprising the captured input. Furthermore, the controller may send the preliminary message to the external device via the wireless communication unit at a specific time based on the determined operating state of the external device.

When the determined operating state is a state in which the external device is available to receive calls or is a state in which the external device is busy, the specific time duration may begin after receiving the call transmission command and may end when an early media session is established and the generated preliminary message may be sent to the external device via the wireless communication unit using a data section assigned to the early media session.

When the determined operating state is a state in which the external device is busy, the specific time duration may begin after receiving the call transmission command and may end when a call outgoing procedure is terminated. Furthermore, the controller may cause the display to display a user interface for selecting an application for sending the preliminary message to the external device.

When the determined operating state is a state in which the external device is off, the specific time duration may begin after receiving the call transmission command and may end when an early media session is established and the generated preliminary message may be sent to the external device via the wireless communication unit using a data section assigned to the early media session.

When the determined operating state is a state in which the external device is off, the specific time duration may begin after receiving the call transmission command and may ends when a call outgoing procedure is terminated. Furthermore, the controller may cause the display to display a user interface for selecting an application for sending the preliminary message to the external device.

The controller may cause the display to display an application list comprising applications each executed in response to a selection input and may change the applications in the displayed application list based on information associated with the external device.

The controller may include the preliminary message sent to the external device in a call history log associated with the external device.

A mobile terminal according to yet another embodiment of the present invention may include a display, a wireless communication unit configured to communicate with an external device, and a controller. The controller may cause the display to display a user interface for generating a preliminary message to be transmitted to the external device before a call is connected with the external, and may send the preliminary message via the wireless communication unit to the external device using a data section assigned to an early media session established before the call is connected.

The displayed user interface may include an option for creating a new preliminary message, editing an existing preliminary message stored in the memory, or selecting an existing preliminary message stored in the memory. Furthermore, the controller may cause the display to display the user interface before receiving a call transmission command, store the generated preliminary message in the memory, and may send the preliminary message via the wireless communication unit to the external device using the data section assigned to the early media session when the call transmission command is received.

The controller may cause the display to display the user interface after a call transmission command is received.

The user of the mobile terminal according to an embodiment of the present invention may generate a preliminary message using the voice or image of the user obtained before a call is connected after the call is sent, and may send the generated preliminary message to a called terminal before the call is connected.

Furthermore, there is provided a mobile terminal capable of sending a preliminary message, generated before a call is connected after the call is sent, using a data section assigned to an early media session, that is, a non-billing region.

The user of the mobile terminal according to an embodiment of the present invention may send a preliminary message in various ways by taking into consideration the operating state of a called device before a call is connected.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 15 illustrates that a user interface for separately sending a preliminary message when a call is terminated after the call is performed is provided in the mobile terminal according to an embodiment of the present invention;

FIG. 29 illustrates an example in which a generated preliminary message is displayed in a speech bubble form in the mobile terminal according to an embodiment of the present invention;

DETAILED DESCRIPTION OF THE EMBODIMENTS

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
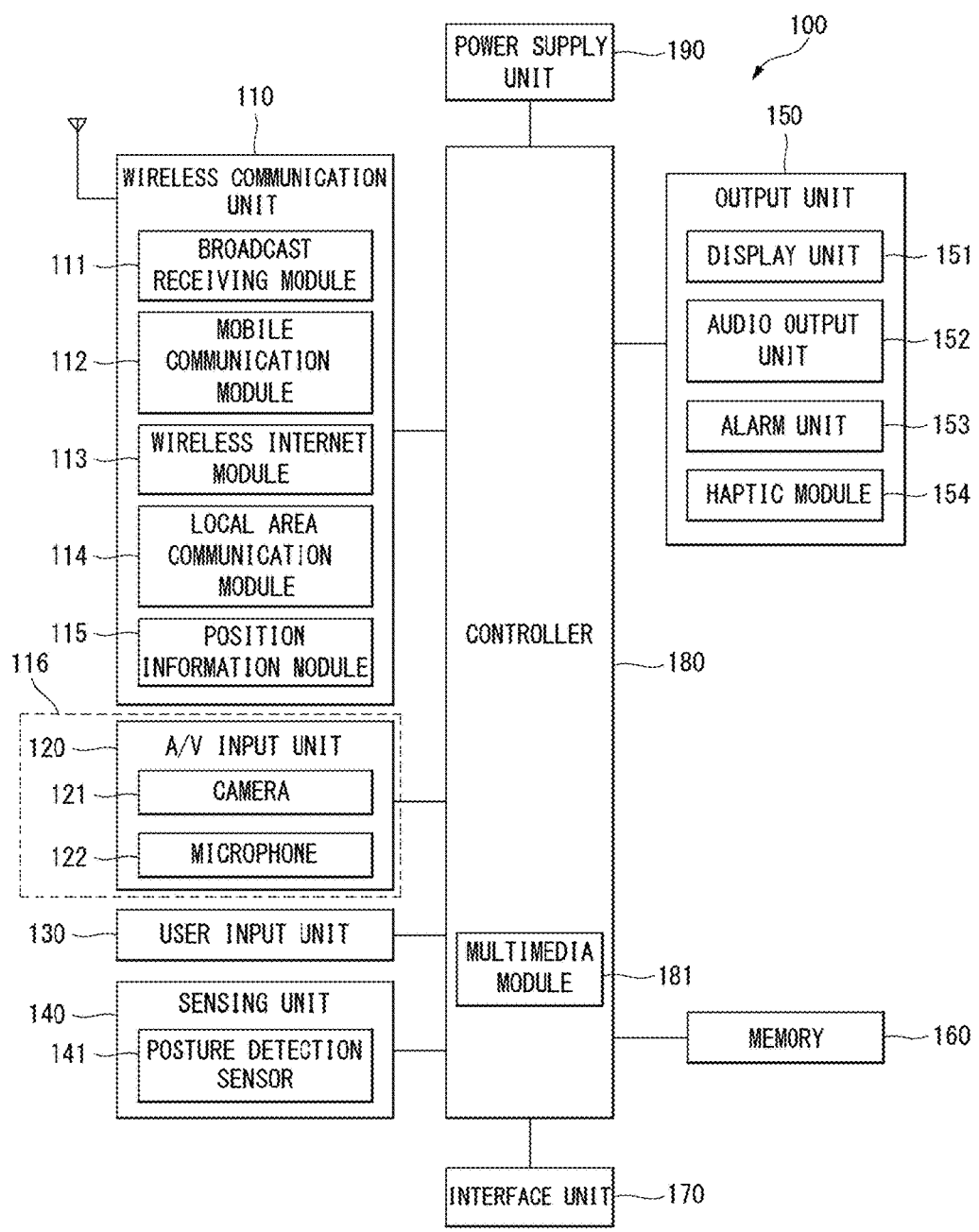
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply unit 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of the text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display module 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

As illustrated in FIG. 1, the A/V input unit 120 and the user input unit 130 may be implemented into a single input unit 116. A variety of kinds of input data generated by the input unit 116 may be used to activate or deactivate memo-related functions performed in the mobile terminal 100 according to an embodiment of the present invention, such as a memo writing function, a memo storage function, and a memo insertion function through the display module 151 implemented using a touch screen. The input data may include images received through the camera 121, a user's voice received through the microphone 122, touches received through the display module 151, and so on. However, the scope of the present invention is not limited to the aforementioned input data.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply unit 190 supplies power and/or whether the interface 170 is connected to an external device. The sensing unit 140 may also include a proximity sensor. The sensing unit 140 may sense a motion of the mobile terminal 100.

The output unit 150 may generate visual, auditory and/or tactile output, and the output unit 150 may include the display module 151, an audio output module 152, an alarm 153 and a haptic module 154. The display module 151 may display information processed by the mobile terminal 100. The display module 151 may display a user interface (UI) and/or a graphic user interface (GUI) related to a telephone call when the mobile terminal 100 is in the call mode. The display module 151 may also display a captured and/or received image, a UI or a GUI when the mobile terminal 100 is in the video telephony mode or the photographing mode.

The display module 151 may include at least one of a liquid crystal display, a thin film transistor liquid crystal display, an organic light-emitting diode display, a flexible display and/or a three-dimensional display. The display module 151 may be of a transparent type or a light transmissive type. That is, the display module 151 may include a transparent display.

The transparent display may be a transparent liquid crystal display. A rear structure of the display module 151 may also be of a light transmissive type. Accordingly, a user may see an object located behind the body (of the mobile terminal 100) through the transparent area of the body of the mobile terminal 100 that is occupied by the display module 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display module 151 and a sensor sensing touch (hereafter referred to as a touch sensor) form a layered structure that is referred to as a touch screen, the display module 151 may be used as an input device in addition to an output device. The touch sensor may be in the form of a touch film, a touch sheet, and/or a touch pad, for example.

The touch sensor may convert a variation in pressure applied to a specific portion of the display module 151 or a variation in capacitance generated at a specific portion of the display module 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensor (of the sensing unit 140) may be located in an internal region of the mobile terminal 100, surrounded by the touch screen, and/or near the touch screen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the mobile terminal 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display module 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply unit 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

The configuration of the mobile terminal 100 according to an embodiment of the present invention has been described above with reference to FIG. 1. A function for generating and sending a preliminary message in the mobile terminal 100 according to an embodiment of the present invention is described in detail below with reference to FIGS. 2 to 39.

Figure 2:
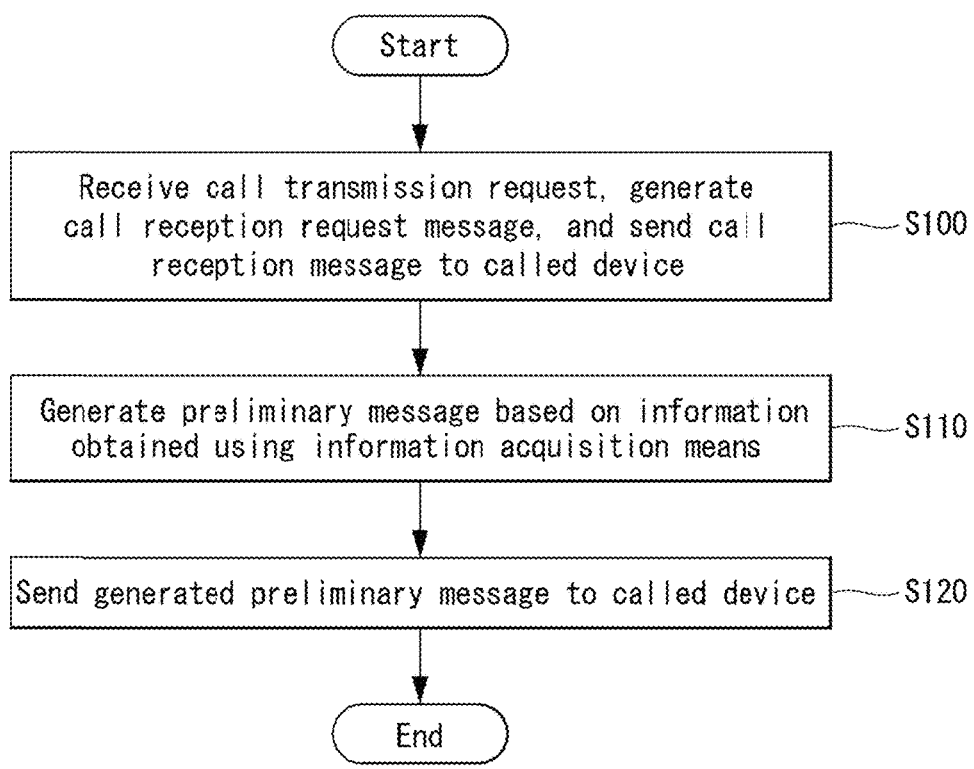
FIG. 2 is a flowchart illustrating an example of a method of driving the mobile terminal according to an embodiment of the present invention.

FIG. 2 is a flowchart illustrating an example of a method of driving the mobile terminal according to an embodiment of the present invention. The method of driving the mobile terminal is described below with reference to required drawings.

When a call transmission request generated based on a user's manipulation for an input device is received, the controller 180 generates a call reception request message and sends the call reception request message to the terminal of a call recipient, that is, a called device, at step S100.

Thereafter, the controller 180 obtains information using information acquisition means before the call is connected to the called device, and generates a preliminary message based on the obtained information at step S110.

In this case, a call may include a common voice call and video call. Furthermore, the information acquisition means may include the camera 121 configured to obtain external images, a microphone 122 configured to obtain sound signals, and a keypad or touch screen configured to generate information based on a user manipulation. However, the scope of the present invention is not limited to the examples.

In this specification, a preliminary message means a message that is transmitted from a calling party to a called device in order to send simple data before regular voice or image data is transmitted and received after a call with the called device is connected. Such a preliminary message may include at least one of a voice message generated based on the voice of a user obtained by the microphone 122, a text message generated based on the voice of a user, and an image of a user obtained by the camera 121.

When the preliminary message is generated, the controller 180 may send the generated preliminary message to the called device through the wireless communication unit 110 at step S120. The preliminary message may be transmitted using an early media session that is assigned before the call is connected to the called device, may be transmitted during the call, or may be transmitted through an independent procedure after the call is terminated. The early media session is described in detail later with reference to FIG. 9.

That is, in accordance with the method of driving the mobile terminal, a calling party may transfer a specific message to a called party before a call is connected, and the called party may check the specific message and obtain information include in the specific message.

Figure 3:
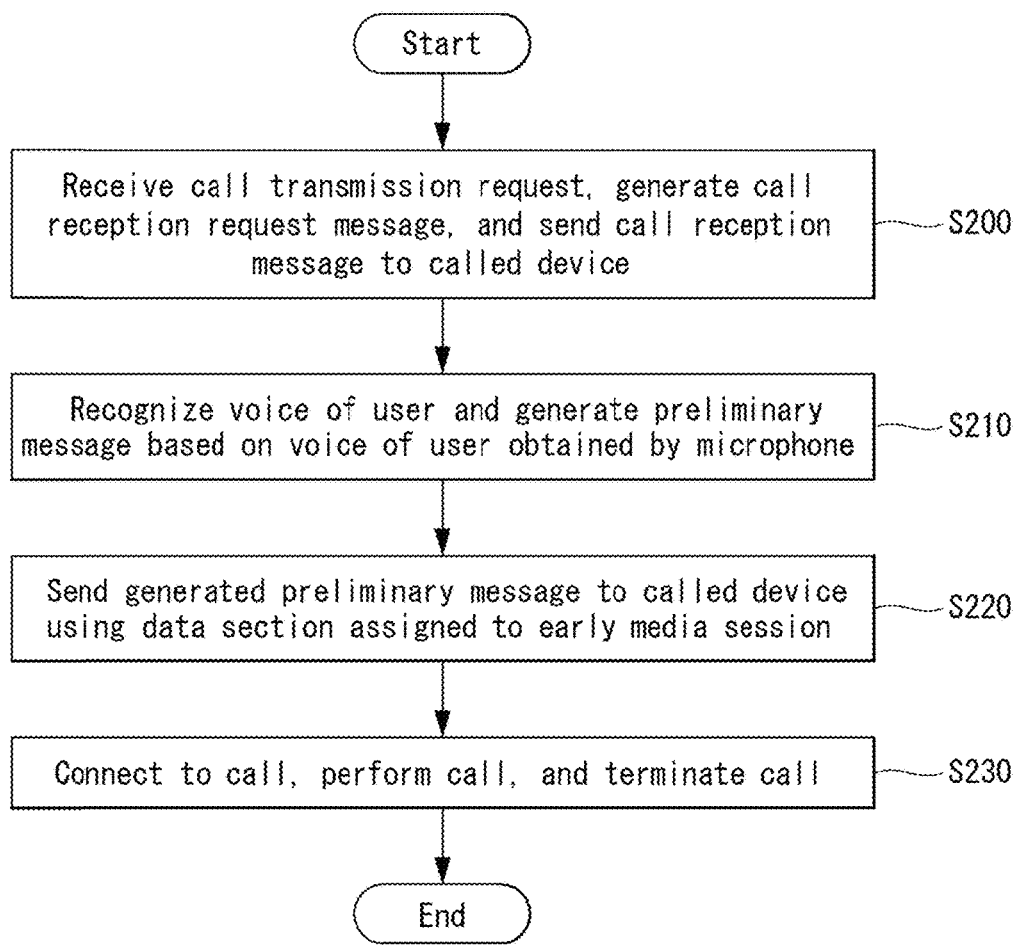
FIG. 3 is a flowchart illustrating another example of a method of driving the mobile terminal according to an embodiment of the present invention.

FIG. 3 is a flowchart illustrating another example of a method of driving the mobile terminal according to an embodiment of the present invention. The method of driving the mobile terminal is described below with reference to required drawings.

When a call transmission request is received, the controller 180 generates a call reception request message and sends the call reception request message to a called terminal at step S200. Thereafter, when the voice of a user is recognized through the microphone 122 of the user, the controller 180 generates a preliminary message based on the voice of the user obtained by the microphone 122 at step S210.

Furthermore, the controller 180 sends the generated preliminary message to the called device using a data section assigned to an early media session, that is, a non-billing region prior to call connection, at step S220. In response thereto, the user of the called device may receive the message generated by the user of the calling terminal even before the call is connected.

Figure 4:
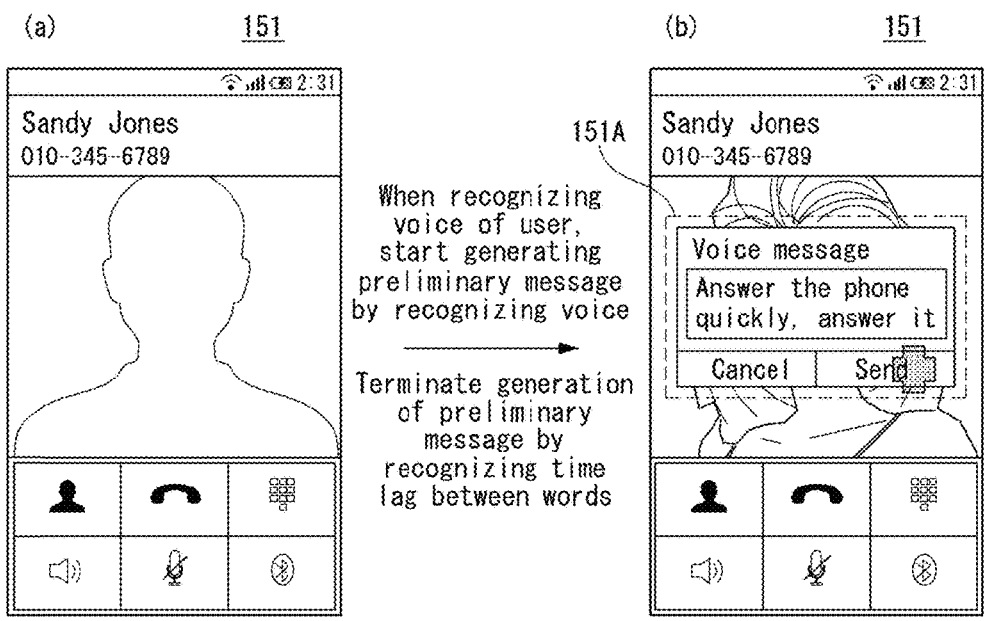
FIG. 4 illustrates an example in which a preliminary message is generated and transmitted in the method of driving the mobile terminal shown in FIG. 3.

FIG. 4 illustrates an example in which a preliminary message is generated and transmitted in the method of driving the mobile terminal shown in FIG. 3.

FIG. 4(a) illustrates that the generation of a preliminary message is started based on the recognized voice of a user when the voice of the user is recognized after a call reception request message is transmitted. The generation of the preliminary message may be terminated when the voice of the user is fully input by recognizing a time lag between the words of the voice of the user obtained through the microphone 122.

FIG. 4(b) illustrates that a voice message "Check it quickly, check it" has been generated based on the voice of the user and a user interface 151A for sending the voice message to a called device has been displayed on the touch screen 151. As illustrated in FIG. 4(b), when the user touches a send button "Send" in the user interface 151A, the voice message may be transmitted to the called device. Furthermore, when the user touches a cancel button "Cancel" in the user interface 151A, the transmission of the preliminary message may be cancelled.

A shaded cross shape illustrated in FIG. 4(b) may indicate that the touch of the user is received. The same principle may apply to other embodiments.

Unlike in that illustrated in FIG. 4, the controller 180 may directly send the generated preliminary message to the called terminal without performing the process of providing the user interface 151A.

Figure 5:
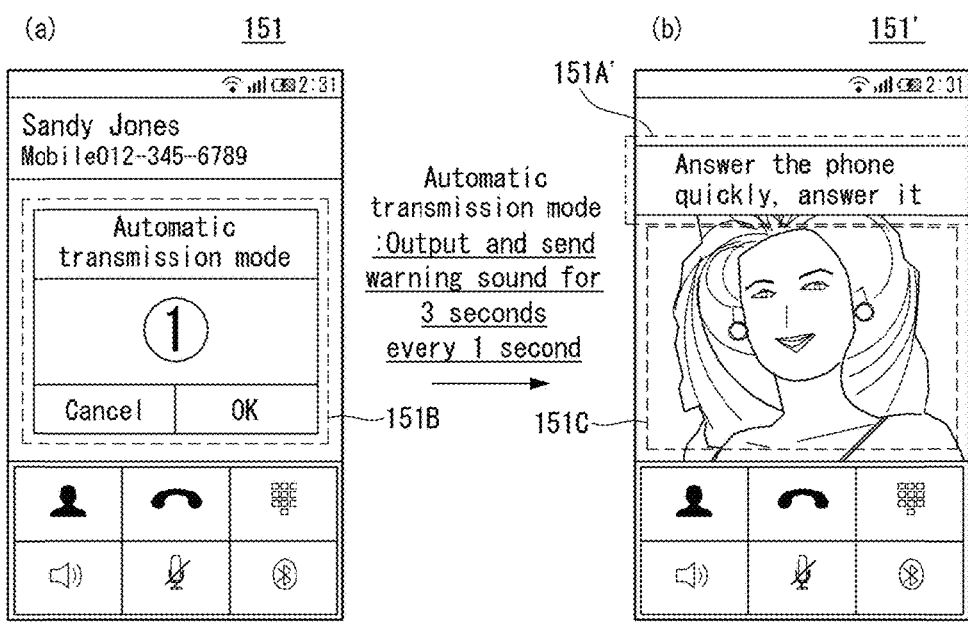
FIG. 5 illustrates another example in which a preliminary message is generated and transmitted in the method of driving the mobile terminal shown in FIG. 3.

FIG. 5 illustrates another example in which a preliminary message is generated and transmitted in the method of driving the mobile terminal shown in FIG. 3.

FIG. 5(a) illustrates that automatic transmission mode is executed when a preliminary message is generated. From FIG. 5(a), it may be seen that a user interface 151B indicative that a preliminary message will be automatically transmitted in 1 second is provided to the touch screen 151.

As illustrated in FIG. 5, in automatic transmission mode, the controller 180 may notify a user that the preliminary message will be automatically transmitted by outputting a warning sound for 3 seconds every 1 second. At this time, the user may cancel the transmission of the preliminary message by touching a cancel button "Cancel".

FIG. 5(b) illustrates that a generated preliminary message including text 151A' and an image 151C of a calling party is displayed on the touch screen 151' of a called terminal.

Unlike in that illustrated in FIG. 5, the controller 180 may automatically send the generated preliminary message to the called terminal without performing the generation of the user interface 151B or an alarm.

Figure 6:
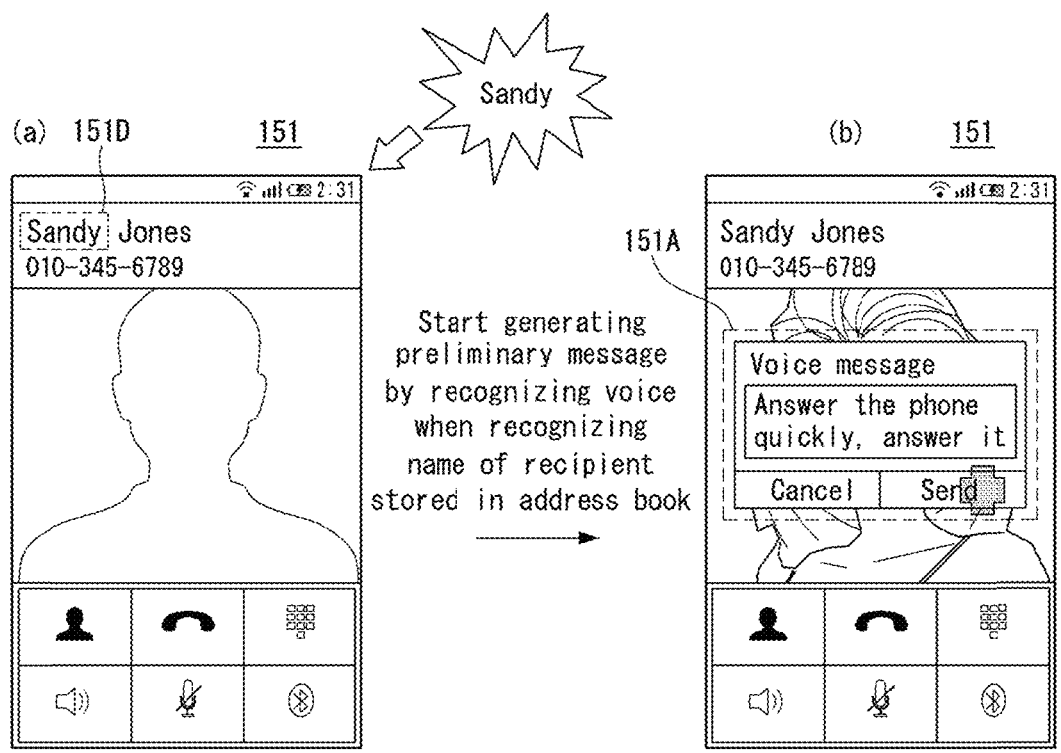
FIG. 6 illustrates yet another example in which a preliminary message is generated and transmitted in the method of driving the mobile terminal shown in FIG. 3.

FIG. 6 illustrates yet another example in which a preliminary message is generated and transmitted in the method of driving the mobile terminal shown in FIG. 3.

FIG. 6(a) illustrates that when a user's calling the name "Sandy" of a called party stored in an address book is recognized, the generation of a preliminary message is started based on the voice of the user recognized through the microphone 122. FIG. 6(b) illustrates that a user interface 151A for selecting whether or not to send the generated preliminary message is provided to the touch screen 151.

FIG. 6 has illustrated an example in which the name of a called party is recognized based on the voice of a user, but the mobile terminal 100 according to an embodiment of the present invention may start obtaining information for generating a preliminary message when a specific word is recognized based on the voice of the user in addition to the voice of the called party.

Figure 7:
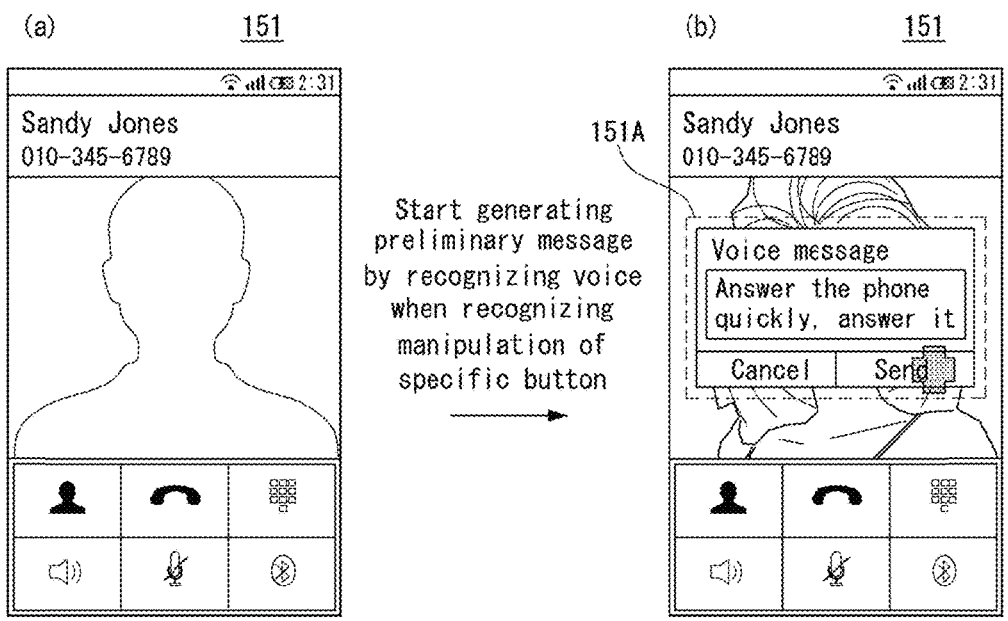
FIG. 7 illustrates further yet another example in which a preliminary message is generated and transmitted in the method of driving the mobile terminal shown in FIG. 3.

FIG. 7 illustrates further yet another example in which a preliminary message is generated and transmitted in the method of driving the mobile terminal shown in FIG. 3.

FIG. 7(a) illustrates that when a user's manipulation of a specific button is recognized, the generation of a preliminary message is started based on the voice of the user recognized through the microphone 122. FIG. 7(b) illustrates that a user interface 151A for selecting whether or not to send the generated preliminary message is provided to the touch screen 151.

FIG. 7 has illustrated an example in which when the manipulation of a specific button is recognized, the acquisition of information for writing a preliminary message is started, but the acquisition of information for writing a preliminary message may be started when a combination of simultaneous or sequential button manipulations or the manipulation of a virtual keypad is recognized.

Figure 8:
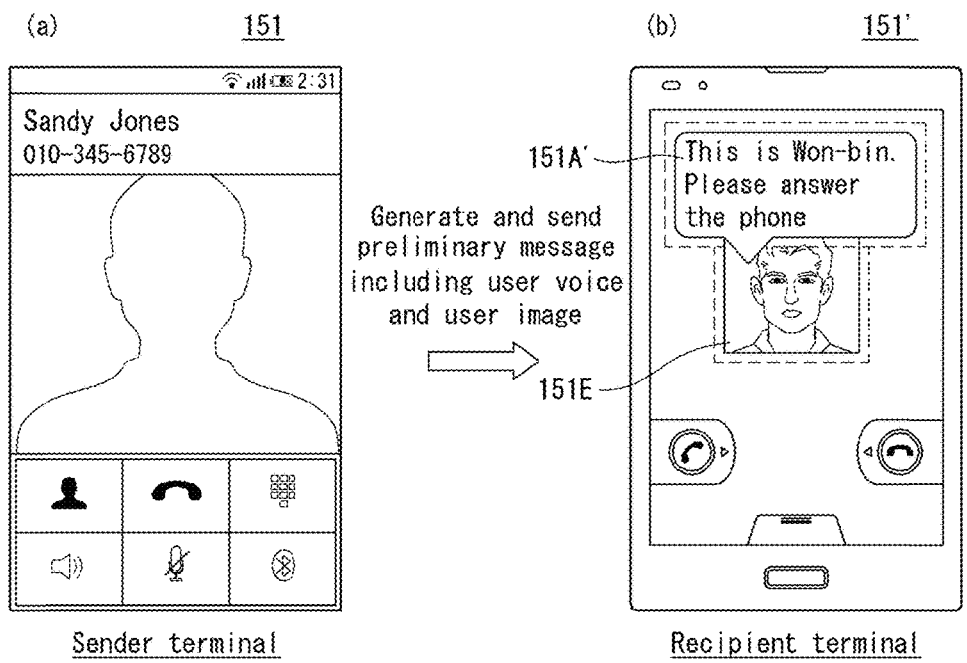
FIG. 8 illustrates still yet another example in which a preliminary message is generated and transmitted in the method of driving the mobile terminal shown in FIG. 3.

FIG. 8 illustrates still yet another example in which a preliminary message is generated and transmitted in the method of driving the mobile terminal shown in FIG. 3.

FIG. 8(a) illustrates that a preliminary message is generated based on an image of a user obtained by the camera 121 along with the voice of the user recognized through the microphone 122.

FIG. 8(b) illustrates that a preliminary message received from a calling terminal is displayed on the terminal of a call recipient before a call is connected. From FIG. 8(b), it may be seen that the preliminary message includes a text message 151A' generated based on the voice of the calling party and an image 151E of the calling party.

Figure 9:
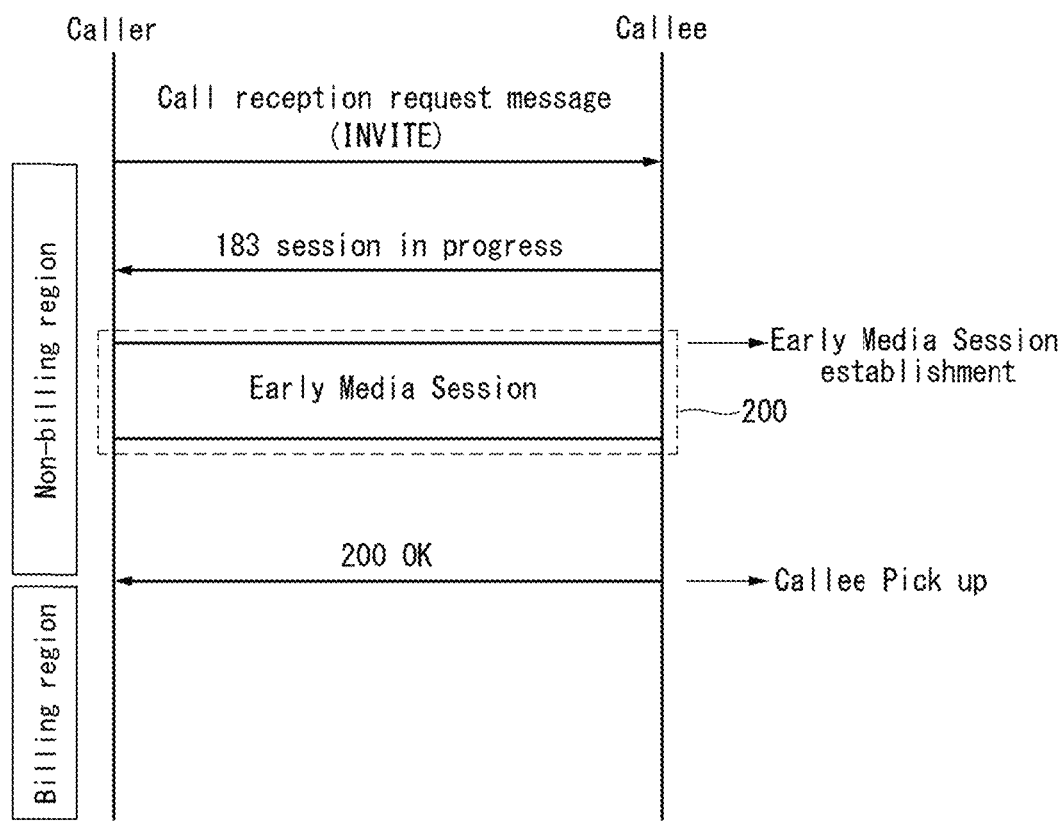
FIG. 9 is a conceptual diagram illustrating an early media session in which a preliminary message is transmitted in the method of driving the mobile terminal shown in FIG. 3.

FIG. 9 is a conceptual diagram illustrating an early media session in which a preliminary message is transmitted in the method of driving the mobile terminal shown in FIG. 3.

First, in response to the call transmission request of a calling party, the controller 180 sends a call reception request message "INVITE" to a called terminal. Thereafter, an early media session 200 is set up between the calling terminal and the called terminal. Thereafter, a call is connected between the calling terminal and the called terminal. A non-billing region is present prior to call connection, and a billing region is present after call connection.

In accordance with the method of driving the mobile terminal shown in FIG. 3, the mobile terminal 100 sends a preliminary message using a data section assigned to an early media session. Accordingly, the preliminary message can be transmitted to a called terminal without a separate charge.

The size of a preliminary message transmitted using an early media session is inevitably limited because a data size assigned to the early media session is about 500~900 kilobyte information. That is, there is no problem if the size of the preliminary message is smaller than the size of the early media session. If not, the mobile terminal 100 according to an embodiment of the present invention may reduce the size of the preliminary message by performing an additional data processing process for reducing the size of the preliminary message, and may send the reduced preliminary message to a called terminal using the early media session.

Figure 10:
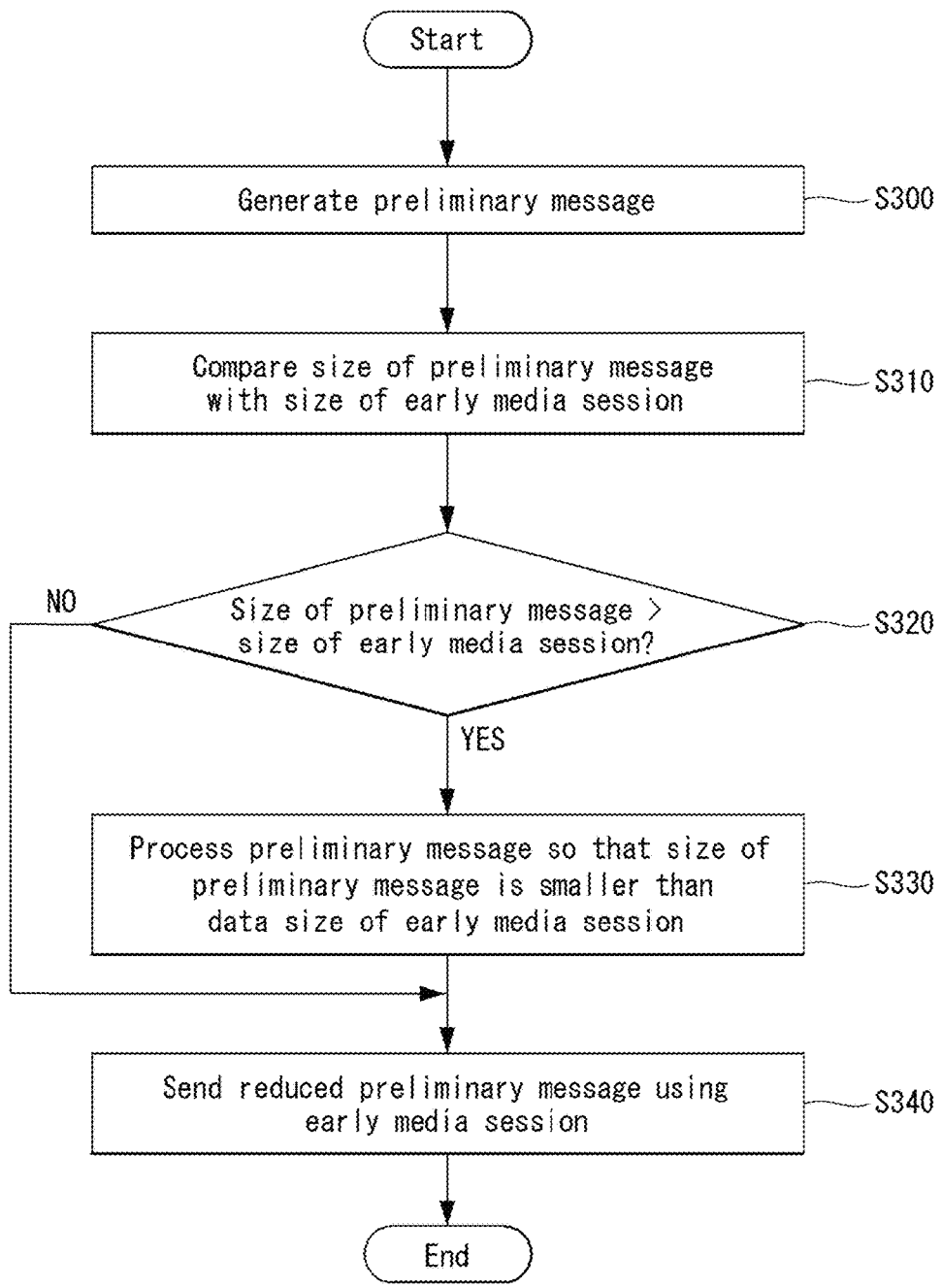
FIG. 10 is a flowchart illustrating yet another example of a method of driving the mobile terminal, wherein a preliminary message is processed by taking into consideration the size assigned to an early media session according to an embodiment of the present invention.

FIG. 10 is a flowchart illustrating yet another example of a method of driving the mobile terminal, wherein a preliminary message is processed by taking into consideration the size assigned to an early media session according to an embodiment of the present invention. The method of driving the mobile terminal is described below with reference to required drawings.

When a preliminary message is generated at step S300, the controller 180 compares the size of the preliminary message with the size of data assigned to an early media session at step S310, and determines whether or not the size of the preliminary message is greater than the data size of the early media session based on a result of the comparison at step S320.

If, as a result of the determination, the size of the preliminary message is found to be greater than the data size of the early media session, the controller 180 processes the preliminary message so that the size of the preliminary message is smaller than the data size of the early media session at step S330, and sends the reduced preliminary message to a called terminal using the early media session.

If, as a result of the determination, the size of the preliminary message is found to be not greater than the data size of the early media session, the controller 180 may send the generated preliminary message to a called terminal without change using the early media session.

Figure 11:
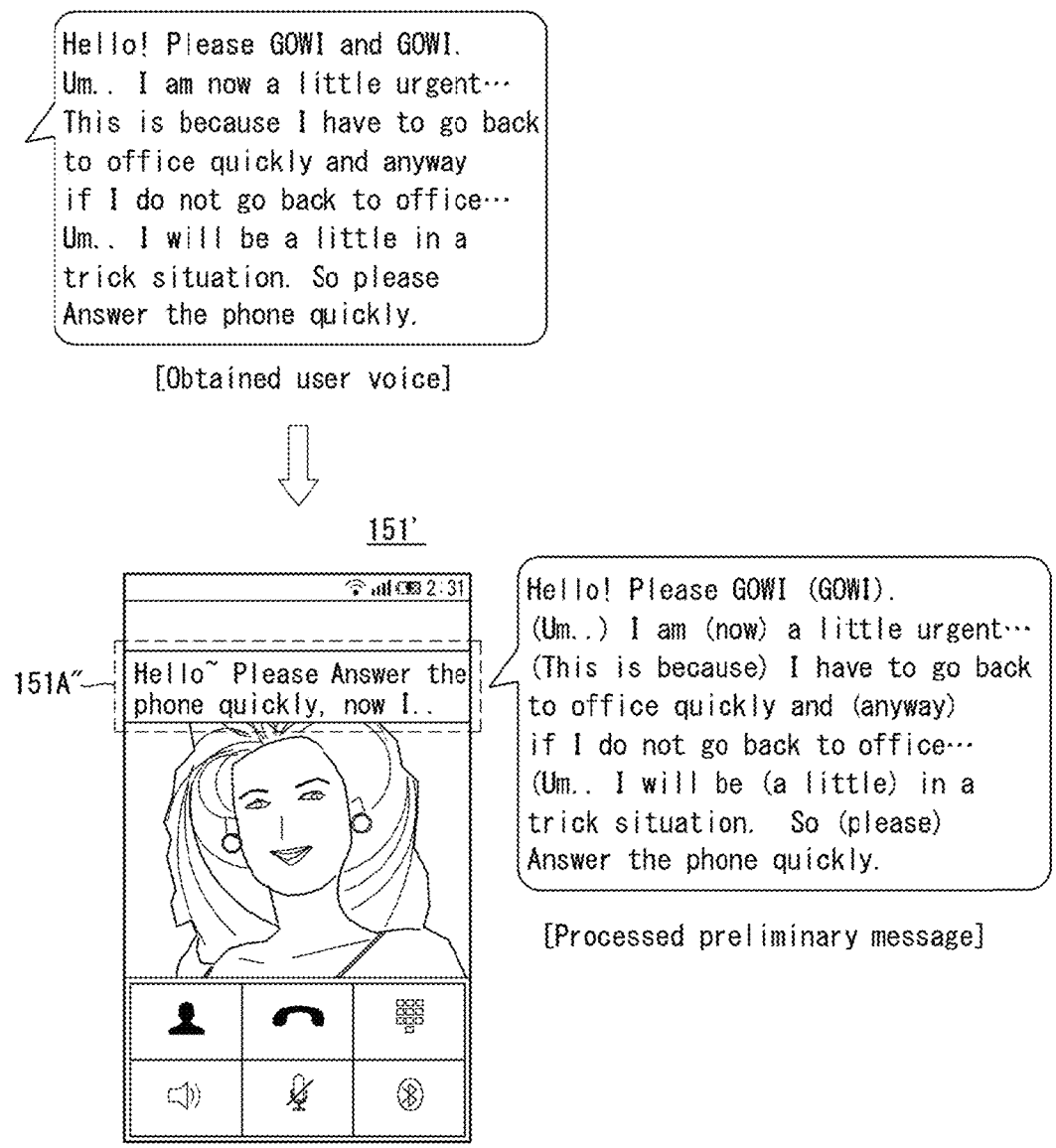
FIG. 11 illustrates an example in which the size of a preliminary message is reduced in the mobile terminal in the method of driving the mobile terminal shown in FIG. 10 according to an embodiment of the present invention.

FIG. 11 illustrates an example in which the size of a preliminary message is reduced in the mobile terminal in the method of driving the mobile terminal shown in FIG. 10 according to an embodiment of the present invention.

More specifically, FIG. 11 illustrates that if a preliminary message including all the obtained voice of a user is greater than the data size of an early media session, the controller 180 deletes some of the preliminary message in order to reduce the size of the preliminary message. In a processed preliminary message 151", contents in parentheses are indicative of parts deleted by the controller 180. The preliminary message illustrated in FIG. 11 maybe a voice message, or may be a text message converted from voice.

The parts deleted by the controller 180 may be repeated words or words that may be deleted in context, but the scope of the present invention is not limited thereto. Furthermore, the controller 180 may reduce the size of a preliminary message by summarizing the contents of the preliminary message in addition to deleting some of the preliminary message.

Although not illustrated, the controller 180 may reduce the size of a preliminary message through processing, such as by lowering the resolution of an image of a user included in the preliminary message or by reducing the sampling rate of a voice message included in the preliminary message.

Figure 12:
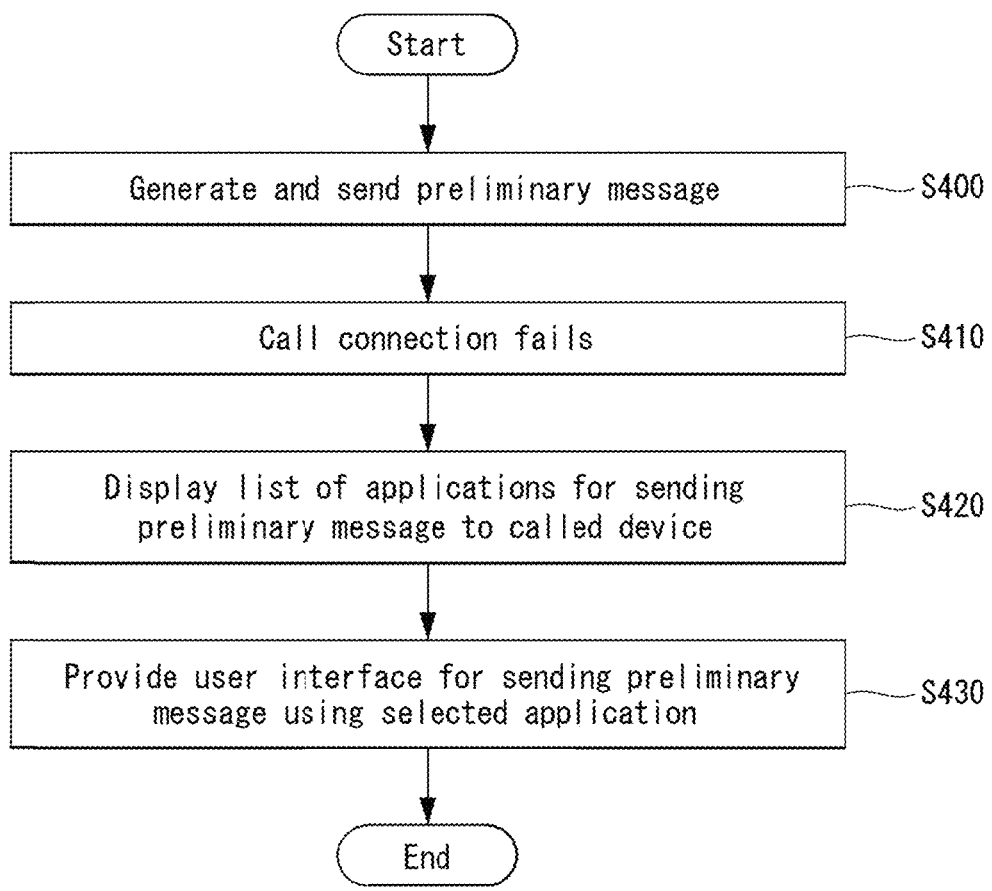
FIG. 12 is a flowchart illustrating further yet another example of a method of driving the mobile terminal according to an embodiment of the present invention.

FIG. 12 is a flowchart illustrating further yet another example of a method of driving the mobile terminal according to an embodiment of the present invention. The method of driving the mobile terminal is described below with reference to required drawings.

A preliminary message is generated and transmitted at step S400, but call connection fails at step S410. In this case, separately from the execution of a call application, a user interface including a list of applications for sending the preliminary message to a called device is displayed on the display module 151 at step S420.

One of the list of applications selected through the user interface is executed, and a user interface (i.e., a screen on which the selected application is executed) for sending the preliminary message using the selected application is provided through the display module 151 at step S430.

Figure 13:
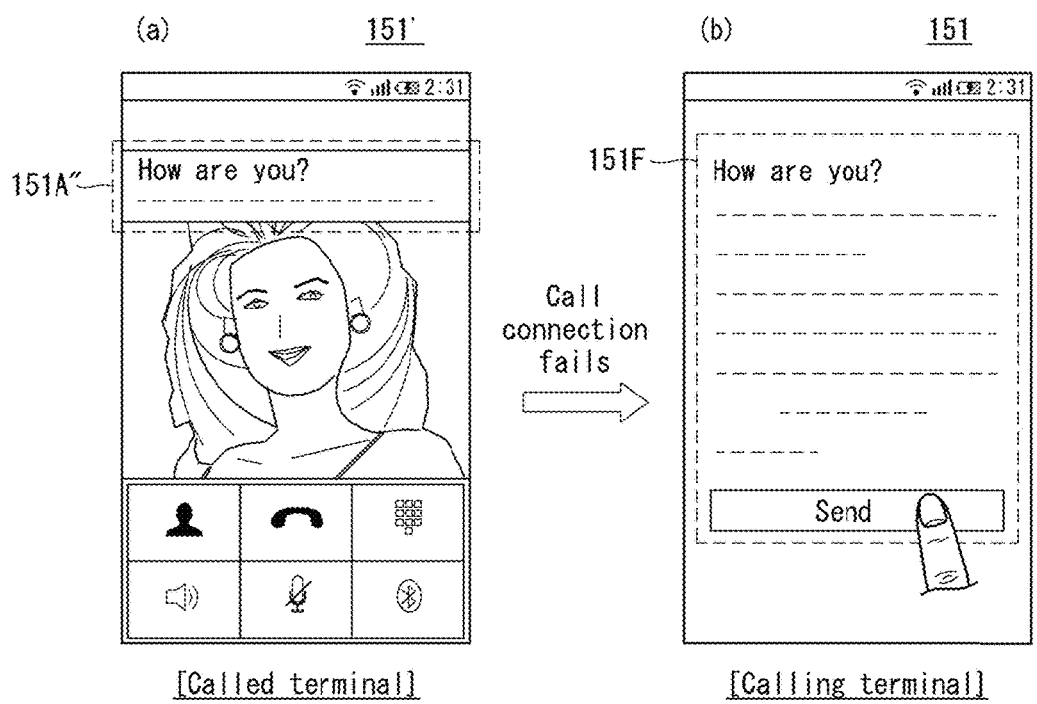
FIGS. 13 and 14 illustrate examples of a process of sending a preliminary message to a called terminal when a call fails in the method of driving the mobile terminal shown in FIG. 12.
Figure 14:
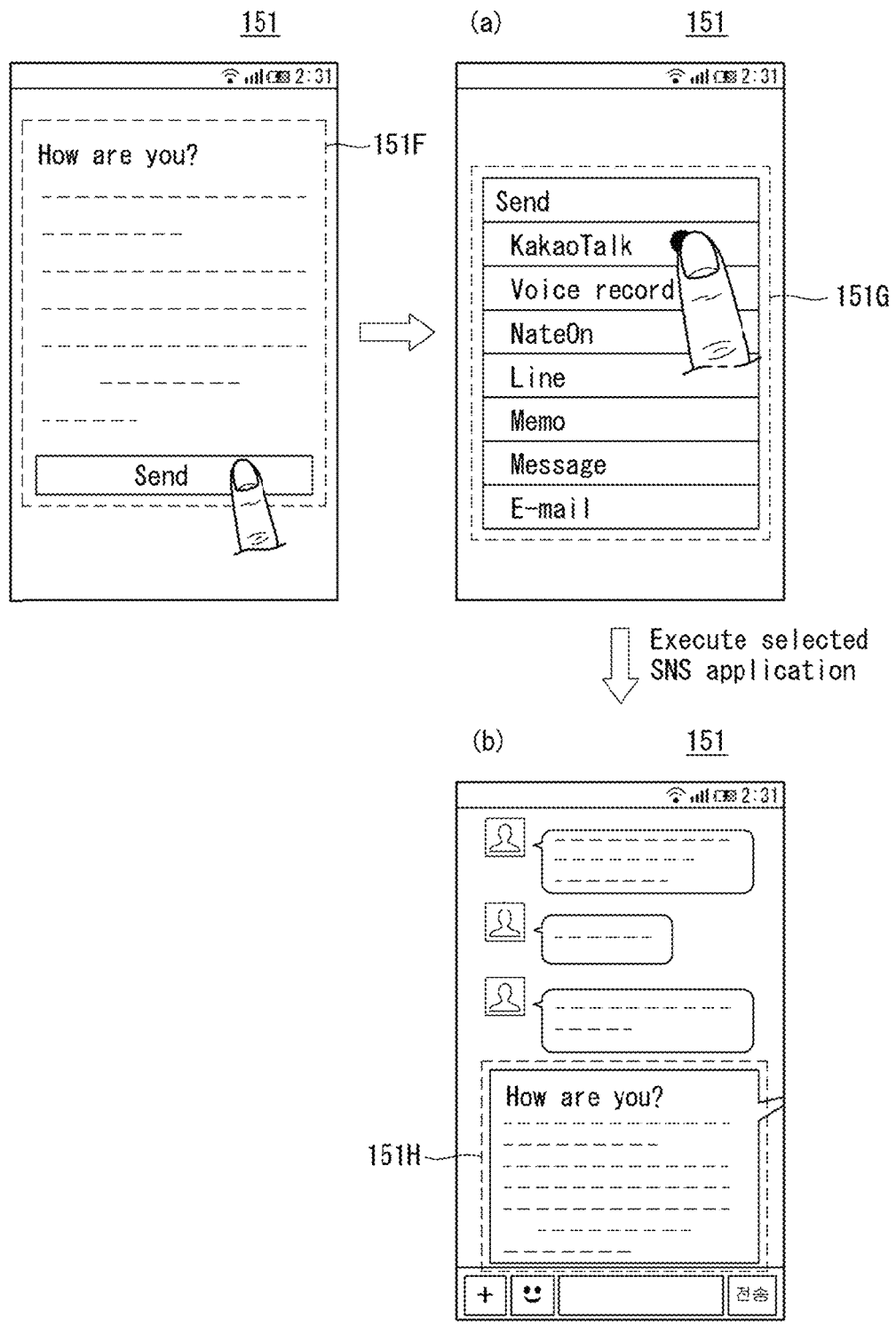

FIGS. 13 and 14 illustrate examples of a process of sending a preliminary message to a called terminal when a call fails in the method of driving the mobile terminal shown in FIG. 12.

FIG. 13(a) illustrates that a preliminary message generated by a calling terminal is received before a call is connected. In the state of FIG. 13(a), call connection fails. In this case, the controller 180 displays a user interface 151F for determining whether or not to send the generated preliminary message to a called terminal is displayed on the touch screen 151, as illustrated in FIG. 13(b).

A user touches a send button in the user interface. In response thereto, the controller 180 displays a user interface 151G, including a list of applications for selecting an application used to send the preliminary message to the called terminal, on the touch screen 151, as illustrated in FIG. 14(a).

The user selects a specific SNS application in the user interface 151G. In response thereto, the controller 180 sends the preliminary message to the called terminal by executing the selected SNS application, as illustrated in FIG. 14(b). From FIG. 14(b), it may be seen that a preliminary message 151H is transmitted to the called terminal through the SNS application along with messages written in the selected SNS application.

The controller 180 may directly perform the process of providing the user interface 151G shown in FIG. 14(a) without performing the process of providing the user interface 151F shown in FIG. 13(b). Furthermore, if call connection fails and a call outgoing procedure is terminated, the controller 180 may execute a predetermined application in order to send the preliminary message so that the preliminary message is automatically transmitted to the called terminal.

The list of applications provided in order to send the preliminary message may be differently set depending on a called terminal. This is described in detail below with reference to FIG. 15.

FIG. 15 illustrates that a user interface for separately sending a preliminary message when a call is terminated after the call is performed is provided in the mobile terminal according to an embodiment of the present invention.

When comparing FIG. 15(a) with FIG. 15(b), it may be seen that in order to send a preliminary message, the number of applications provided to a call counterpart A through a user interface 151G1 is greater than the number of applications provided to a call counterpart B through a user interface 151G2. More specifically, it may be seen that a message application and e-mail application provided to the call counterpart A are not provided to the call counterpart B.

This may result from the difference between the call histories of a calling party for the call counterparts A and B. Furthermore, this may result from the difference in a social network formation history between the call counterparts A and B of a user. Furthermore, this may be different depending on setting predetermined by a user. With consideration taken of that the call histories or social network formation histories of call counterparts are based on means for identifying counterpart terminals or associated with the identification means, a list of applications provided to the call counterparts may be different depending on the terminal (i.e., the called terminal) of a call counterpart.

From FIGS. 15(a) and 15(c), it may be seen that a call counterpart C is further provided with a Bluetooth application and a Wi-Fi application for sending a preliminary message, but is not provided with a 'Line' application through a user interface 151G3 compared to the call counterpart A.

Figure 16:
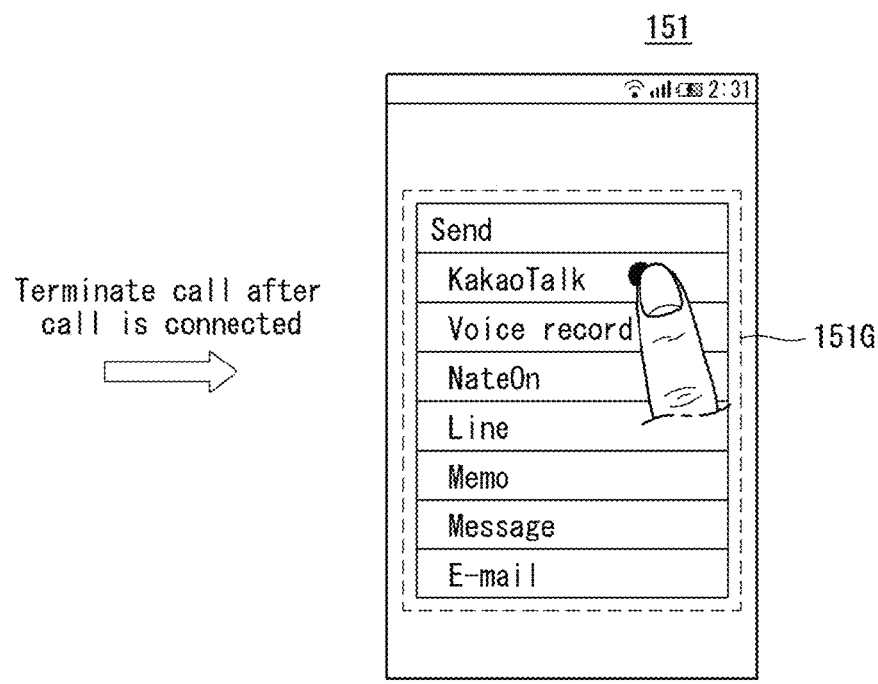
FIG. 16 illustrates that a user interface for sending a preliminary message is provided even when a call is terminated after the call is connected in the mobile terminal according to an embodiment of the present invention.

FIG. 16 illustrates that the user interface 151G for sending a preliminary message is provided even when a call is terminated after the call is connected in the mobile terminal according to an embodiment of the present invention. The list of applications included in the user interface 151G may also differ depending on a called terminal.

Figure 17:
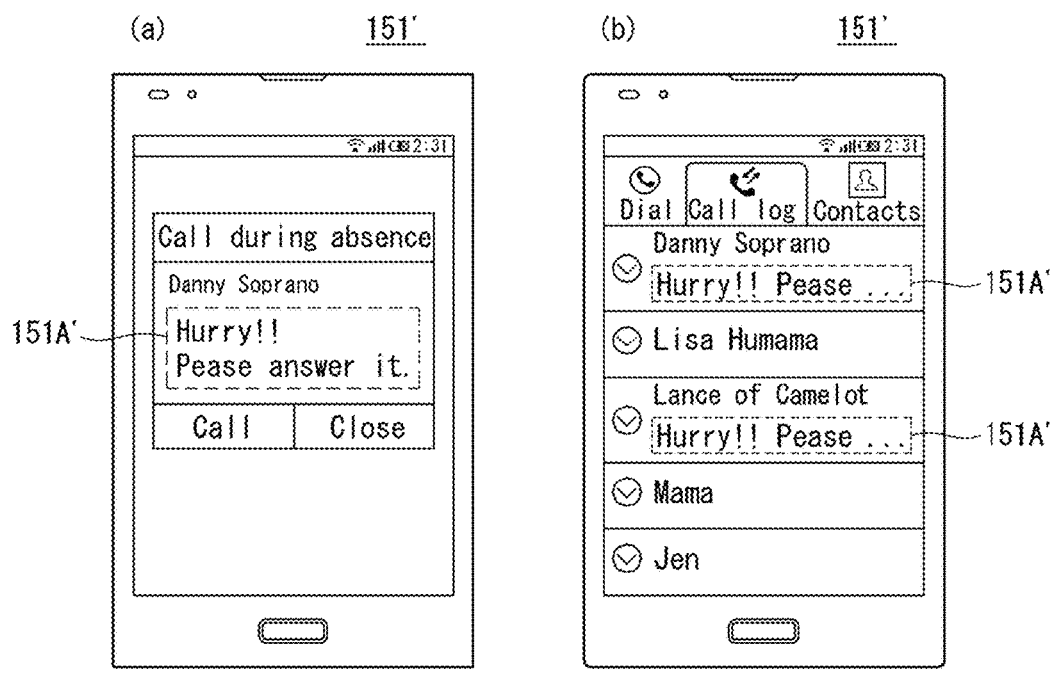
FIGS. 17 and 18 illustrate examples in which a preliminary message transmitted by the mobile terminal is provided in the form of the call history of a called device according to an embodiment of the present invention.
Figure 18:
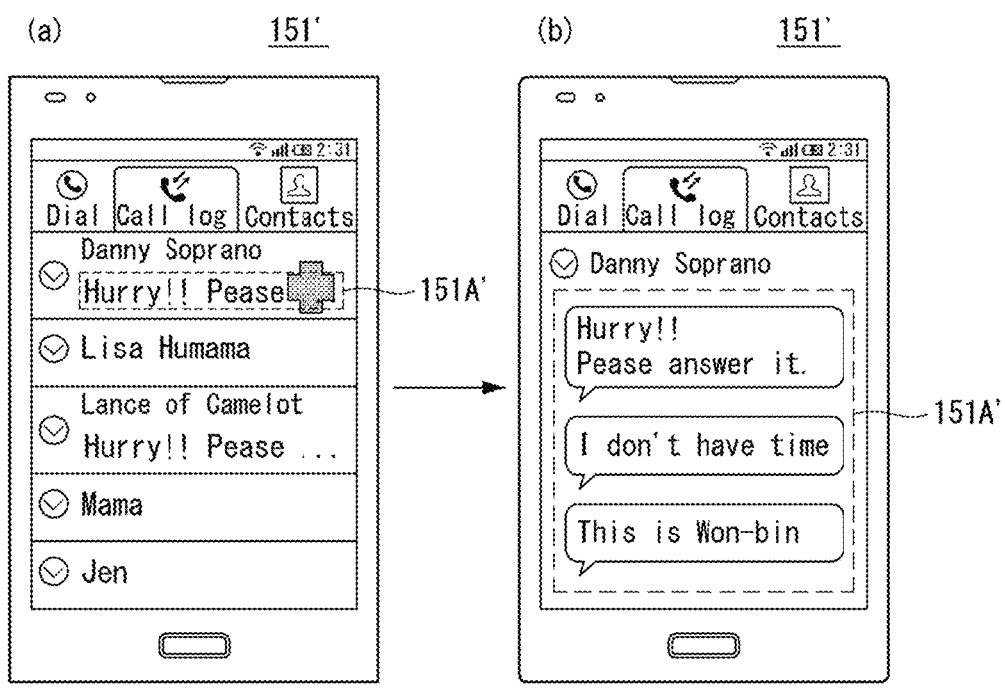

FIGS. 17 and 18 illustrate examples in which a preliminary message transmitted by the mobile terminal 100 is provided in the form of the call history of a called device according to an embodiment of the present invention.

From FIG. 17(a), it may be seen that when call connection with a called device fails, a preliminary message 151A' is included in an absence call history and is displayed on the display module 151' of the called device.

From FIG. 17(b), it may be seen that preliminary messages 151A' transmitted by the mobile terminal 100 according to an embodiment of the present invention are included in the call log of a called terminal and are displayed on the display module 151' of the called device.

FIG. 18(a) illustrates that a touch on a history that belongs to a call log provided by a called terminal and that includes a preliminary message 151A' transmitted by the mobile terminal 100 is received. In this case, the called terminal may display all the preliminary messages 151A' that are included in the history and that are transmitted by the mobile terminal 100 on the display module, as illustrated in FIG. 18(b).

FIGS. 19 to 23 illustrate examples in which a preliminary message is generated based on the voice of a user in the mobile terminal according to an embodiment of the present invention.

Figure 19:
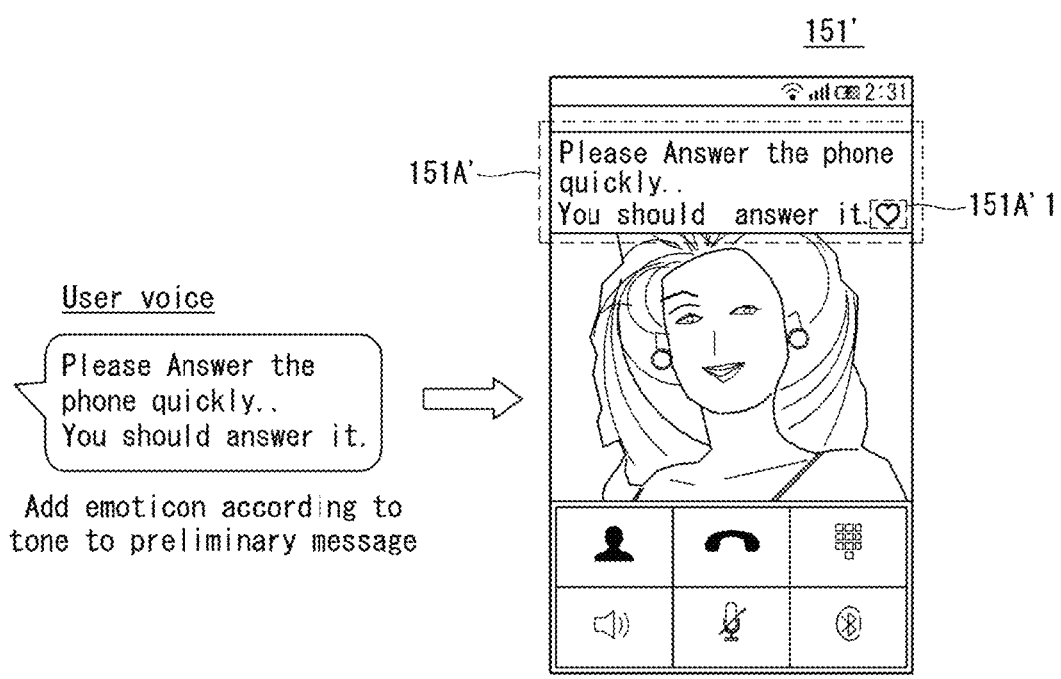
FIGS. 19 to 23 illustrate examples in which a preliminary message is generated based on the voice of a user in the mobile terminal according to an embodiment of the present invention.

From FIG. 19, it may be seen that the mobile terminal 100 according to an embodiment of the present invention may analyze the voice of a user (i.e., a calling party) and add an emoticon according to the tone of the user to a preliminary message. More specifically, in FIG. 19, the mobile terminal 100 has added an emoticon 151A'1 having a heart shape to the preliminary message depending on a lovely tone of the user.

Figure 20:
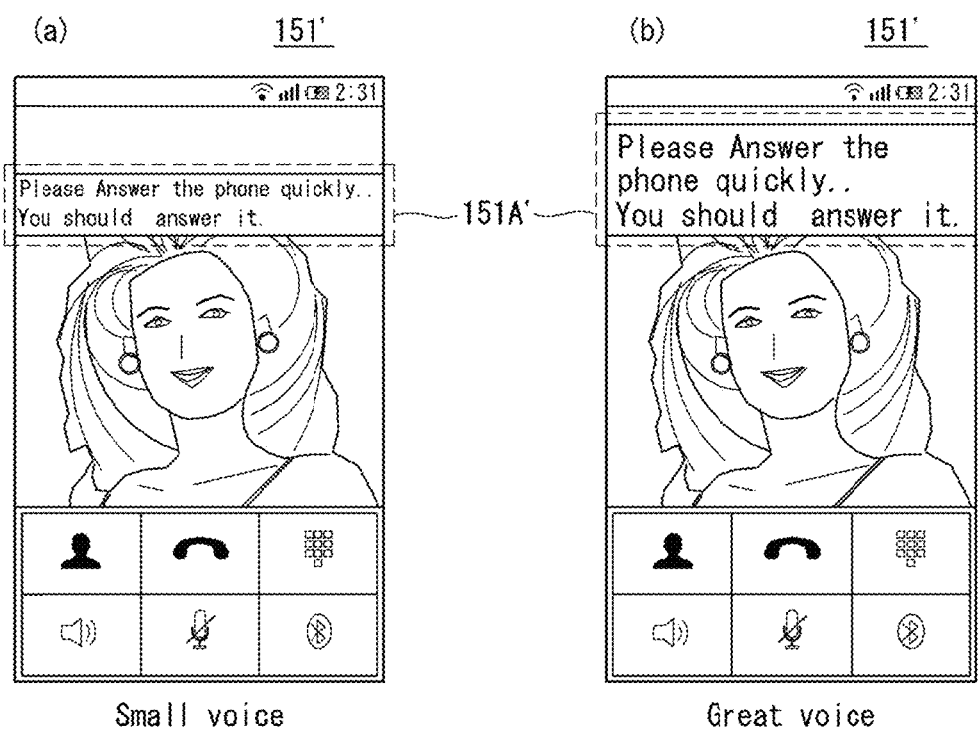

From FIG. 20, it may be seen that the mobile terminal 100 may make different the size of text that forms a preliminary message depending on the size of the obtained voice of a user.

Figure 21:
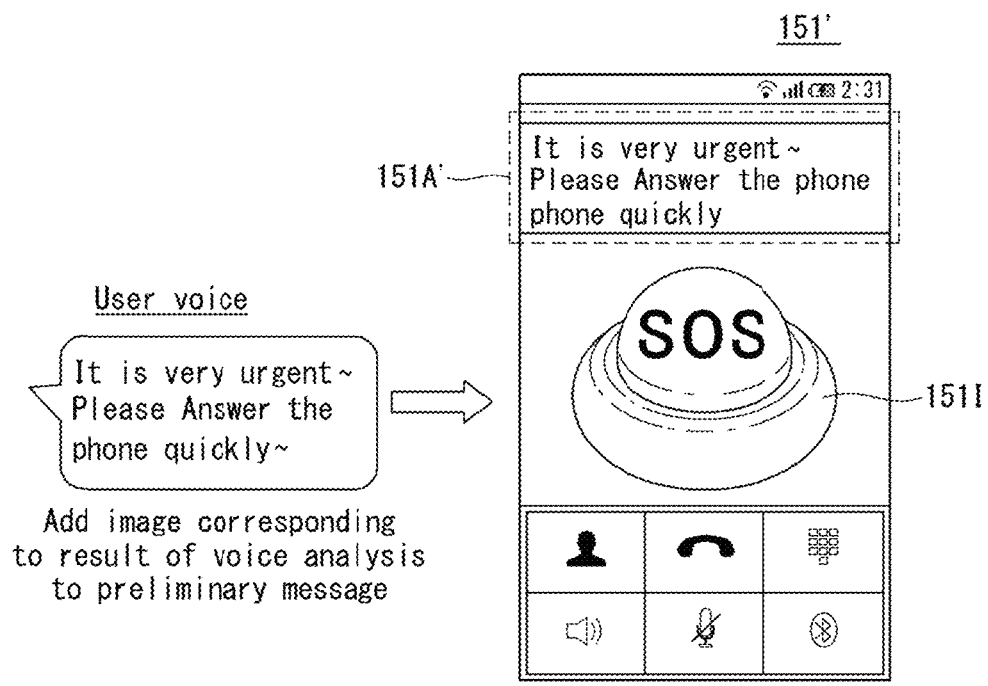

From FIG. 21, it may be seen that the mobile terminal 100 may analyze the voice of a user and add an image corresponding to a result of the analysis to a preliminary message. More specifically, in FIG. 21, the mobile terminal 100 has recognized the urgency of a situation based on a result of the analysis of the voice of the user and has added an image 151I indicative of urgency to the preliminary message.

Figure 22:
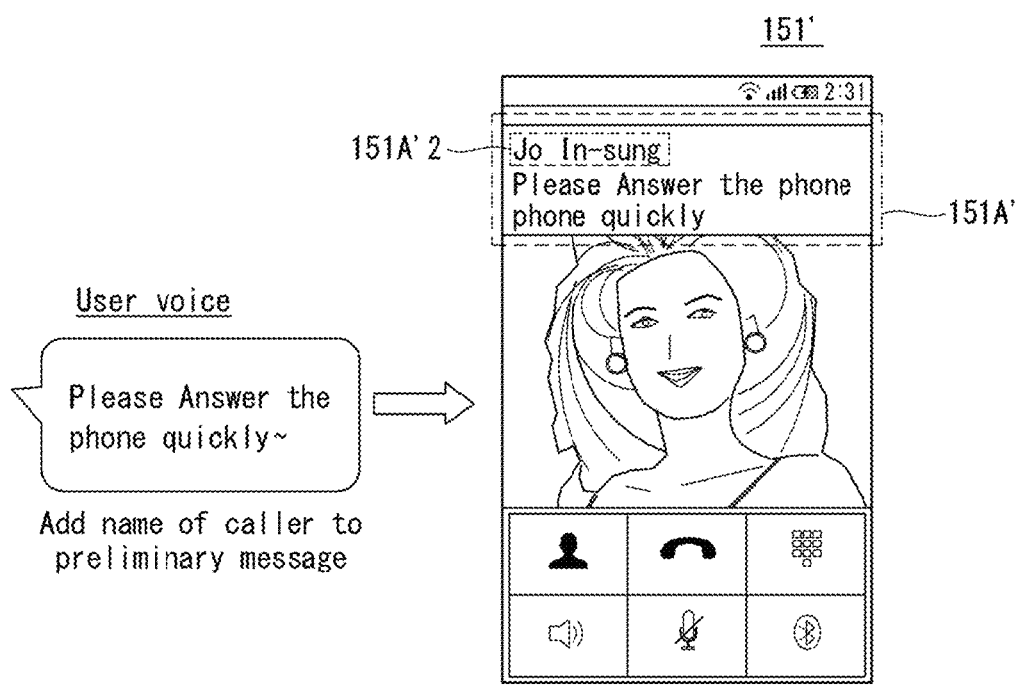

From FIG. 22, it may be seen that the mobile terminal 100 may add the name 151A'2 of a calling party, not included in the obtained voice of a user, to a preliminary message. In such a case, a called party may be aware that a call has been received from whom by checking a received preliminary message 151A'. The mobile terminal 100 may perform such an operation if means for identifying the calling terminal is not stored in the called terminal.

Figure 23:
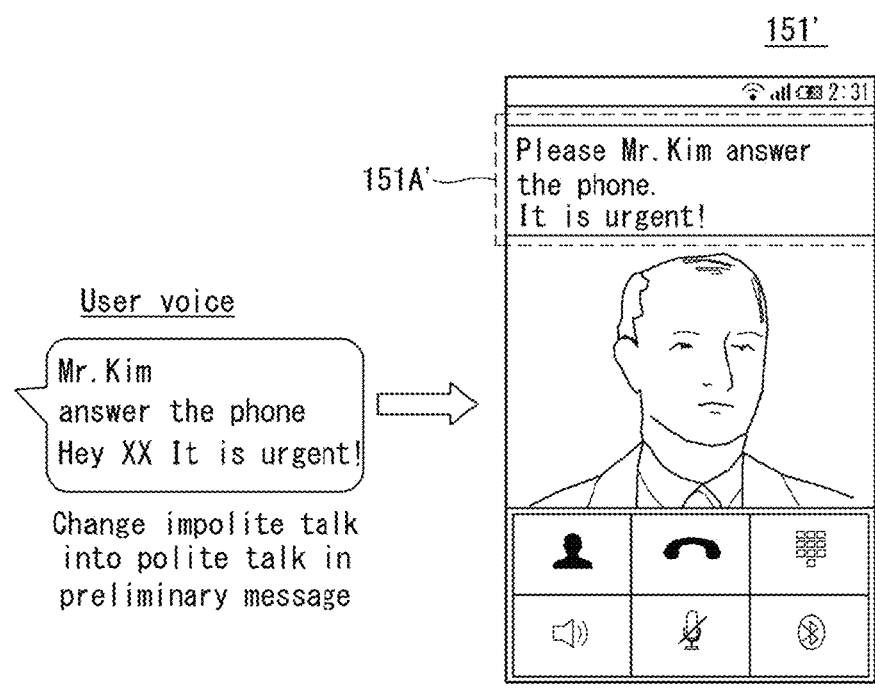

From FIG. 23, it may be seen that the mobile terminal 100 may analyze the voice of a user, may change an impolite talk into a polite talk, and may generate a preliminary message. The mobile terminal 100 may perform such an operation depending on the group of an address book to which a called party belongs.

Figure 24:
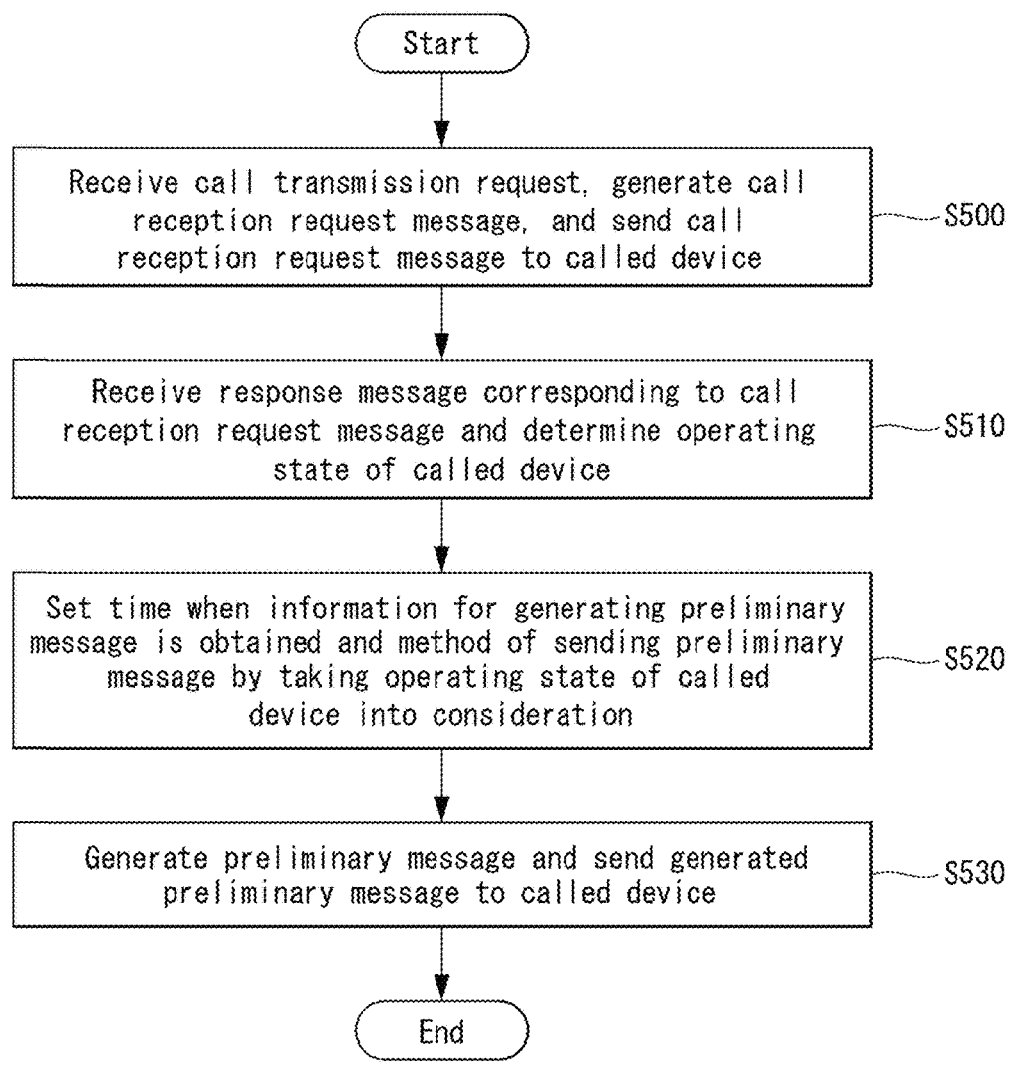
FIG. 24 is a flowchart illustrating still yet another example of a method of driving the mobile terminal according to an embodiment of the present invention.

FIG. 24 is a flowchart illustrating still yet another example of a method of driving the mobile terminal according to an embodiment of the present invention. The method of driving the mobile terminal is described below with reference to required drawings.

When a call transmission request is received, the controller 180 sends a call reception request message to a called device at step S500. Thereafter, when a response message corresponding to the call reception request message is received through the wireless communication unit 110, the controller 180 determines the operating state of the called device based on the received response message at step S510.

Thereafter, the controller 180 sets the time when information for generating a preliminary message is obtained and a method of sending the preliminary message by taking the operating state of the called device into consideration at step S520. In this case, the time when information for generating a preliminary message is obtained means the time when information, that is, a basis for generating a preliminary message, is obtained through the aforementioned information acquisition means.

Thereafter, the controller 180 generates the preliminary message based on the information obtained through the information acquisition means, and sends the generated preliminary message to the called device in accordance with the set method of sending the preliminary message at step S530.

An embodiment in which when the called device is in a call-possible state, the called device generates a preliminary message using information obtained before an early media session is established and sends the preliminary message through a data section assigned to the early media session has been described above. Furthermore, an embodiment which when the called device is in the call-possible state, but call connection fails, a user interface for selecting an application used to send a preliminary message is provided and the preliminary message is transmitted by executing the application selected in the provided user interface has been described above. Accordingly, detailed descriptions of the two embodiments are omitted.

The generation and transmission of a preliminary message when a called terminal is busy or the power of the called terminal is off are described below with reference to FIGS. 25 to 28.

Figure 25:
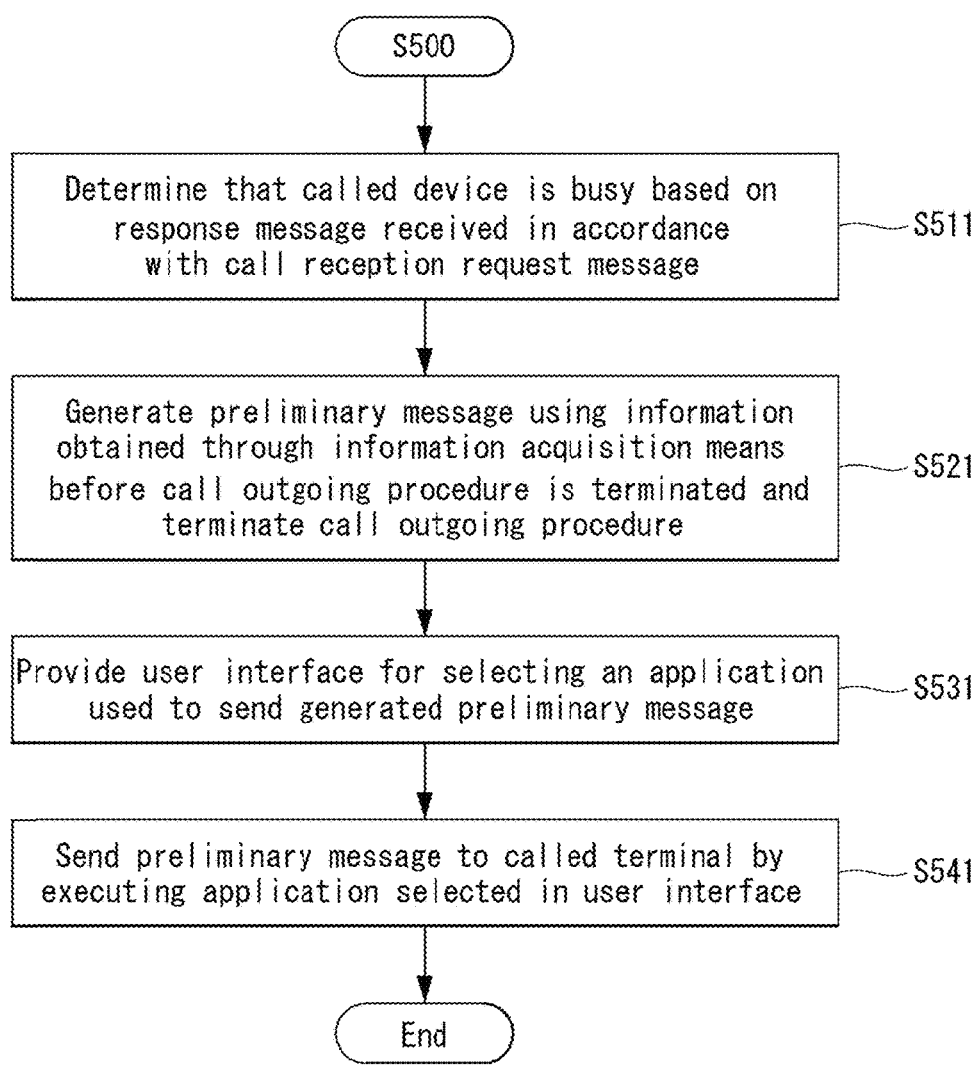
FIG. 25 is a flowchart illustrating an example of the method of driving the mobile terminal shown in FIG. 24.

FIG. 25 is a flowchart illustrating an example of the method of driving the mobile terminal shown in FIG. 24. This is described below with reference to required drawings.

When a response message is received through step S500, the controller 180 determines that a called device is busy based on the response message (i.e., based on information included in the response message) at step S511.

Thereafter, the controller 180 generates a preliminary message using information obtained through the information acquisition means until the call outgoing procedure is terminated. Furthermore, the call outgoing procedure is terminated at step S521. In this case, the termination of the call outgoing procedure may include the case where the call outgoing procedure is terminated based on the setting of the mobile terminal 100 without the intervention of a user and the case where the call outgoing procedure is forcedly terminated based on a user manipulation.

In response thereto, the controller 180 provides a user interface for selecting an application used to send the generated preliminary message through the display module 151 at step S531. Furthermore, the controller 180 executes the application selected in the user interface and sends the preliminary message to the called terminal at step S541.

Unlike in that illustrated in FIG. 25, if the called device is determined to be busy, the mobile terminal 100 according to an embodiment of the present invention may receive a call transmission request or send a call reception request message, may generate a preliminary message based on information obtained through the information acquisition means before an early media session is established, and then may send the preliminary message to a called device using a data section assigned to the early media session. Thereafter, the mobile terminal 100 may terminate the call outgoing procedure.

Figure 26:
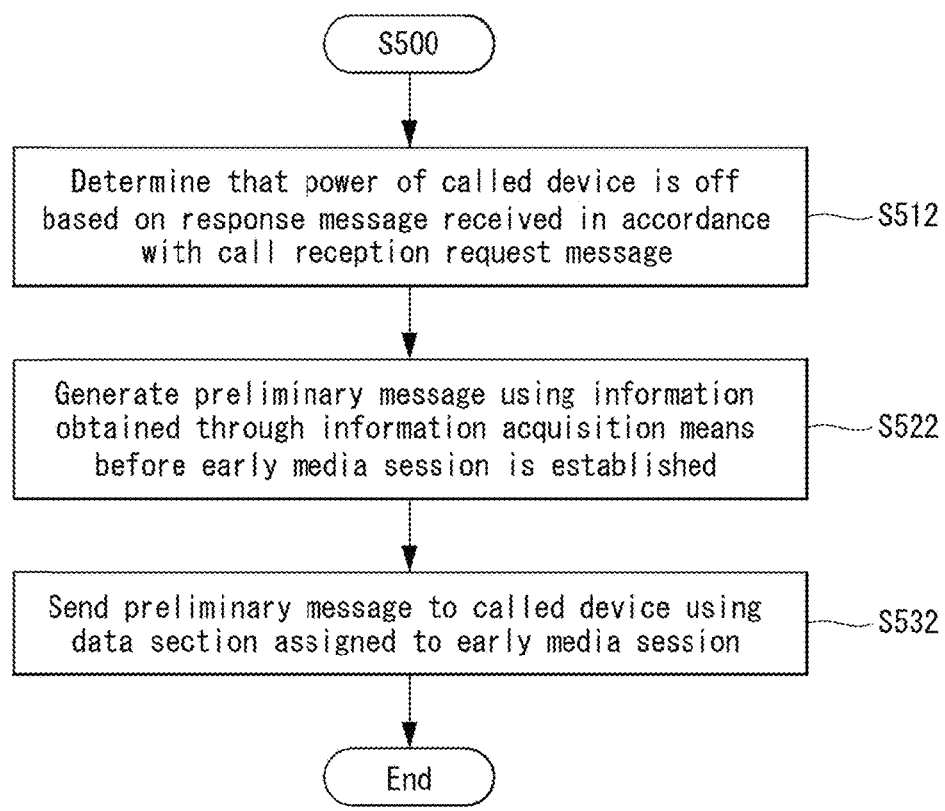
FIG. 26 is a flowchart illustrating another example of the method of driving the mobile terminal shown in FIG. 24.

FIG. 26 is a flowchart illustrating another example of the method of driving the mobile terminal shown in FIG. 24. This is described below with reference to required drawings.

When a response message is received through step S500, the controller 180 determines that the power of a called device is off based on the response message (i.e., based on information included in the response message) at step S512.

Thereafter, the controller 180 generates a preliminary message using information obtained through the information acquisition means before an early media session is established at step S522. Furthermore, the controller 180 sends the preliminary message to the called device using a data section assigned to the early media session at step S532.

Unlike in that illustrated in FIG. 25, if a called device is determined to be busy, the mobile terminal 100 according to an embodiment of the present invention may generate a preliminary message using information obtained through the information acquisition means until the call outgoing procedure is terminated, and may provide a user interface for selecting an application used to send the generated preliminary message.

The term "before the call outgoing procedure is terminated" may mean a term "before the early media session is established, may mean that the call outgoing procedure is terminated depending on the setting of the mobile terminal 100 without the intervention of a user, or may include the case where the call outgoing procedure is forcedly terminated based on a user manipulation.

Figure 27:
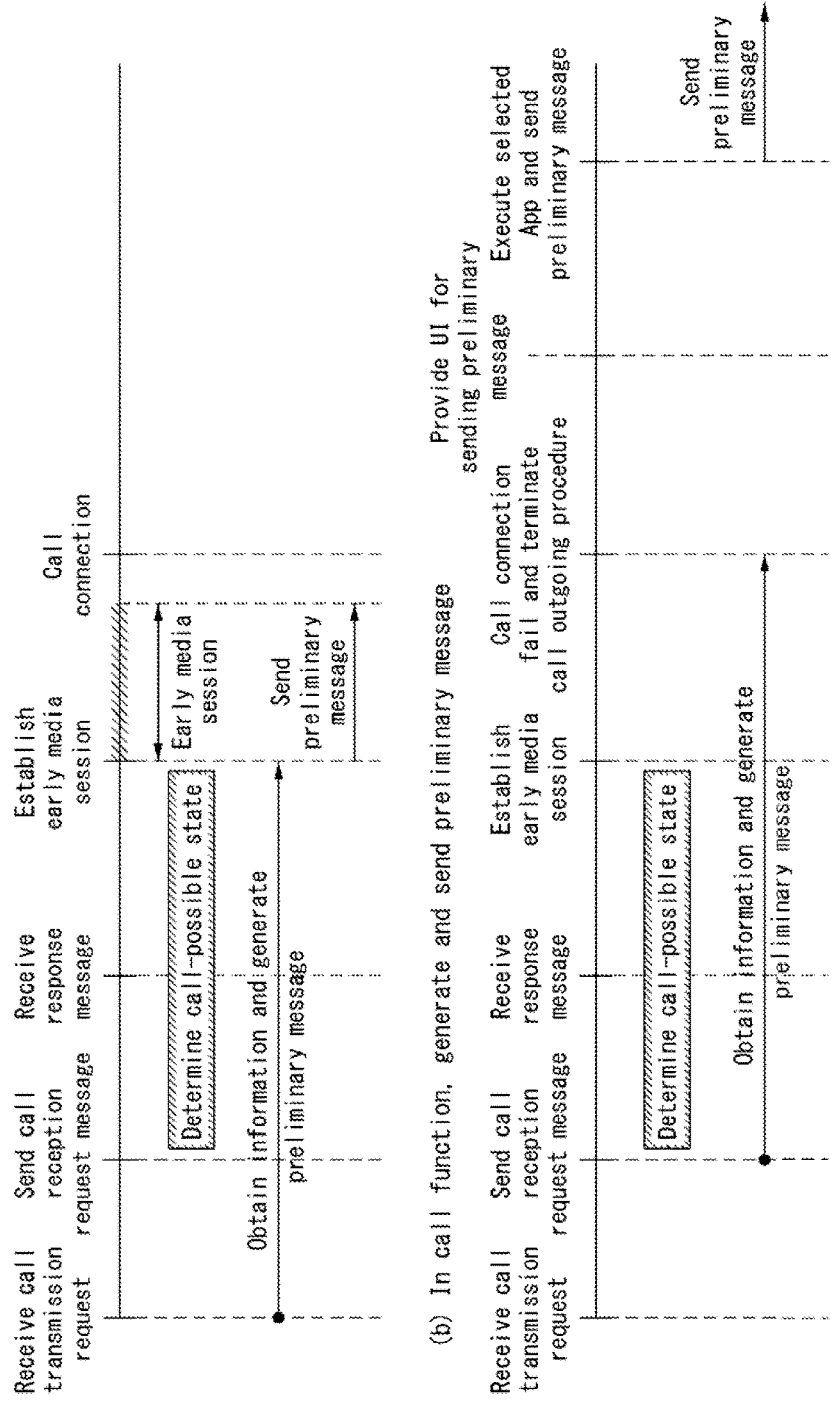
FIG. 27 illustrates examples in which a preliminary message is generated and transmitted when a call with a called device is possible in the method of driving the mobile terminal shown in FIG. 24.

FIG. 27 illustrates examples in which a preliminary message is generated and transmitted when a call with a called device is possible in the method of driving the mobile terminal shown in FIG. 24.

Referring to FIG. 27(*a*), a call transmission request from a user is received. In response thereto, the controller 180 starts obtaining information for generating a preliminary message. Thereafter, the controller 180 sends a call reception request message to a called terminal and then receives a response message corresponding to the call reception request message.

In response to the response message, the controller 180 analyzes data included in the response message and determines that the called device is in a call-possible state based on a result of the analysis. In this case, the controller 180 generates a preliminary message based on information obtained through the information acquisition means before an early media session is established, and sends the generated preliminary message to the called device using a data section assigned to the early media session.

Referring to FIG. 27(*b*), when a call transmission request from a user is received, the controller 180 sends a call reception request message to a called device and then starts obtaining information for generating a preliminary message. Thereafter, the mobile terminal 100 receives a response message corresponding to the call reception request message.

In response to the response message, the controller 180 analyzes data included in the response message and determines that the called device is in a call-possible state based on a result of the analysis. However, call connection fails, and the call outgoing procedure is terminated. In this case, the controller 180 generates a preliminary message based on information obtained through the information acquisition means until the call outgoing procedure is terminated.

Thereafter, the controller 180 provides a user interface for selecting an application used to send the preliminary message, and sends the generated preliminary message to the called device by executing the application selected by the user in the user interface.

Although not illustrated in FIG. 27, the start point of time at which the information for generating the preliminary message is obtained may be a specific point of time between a point of time at which the call transmission request is received and a point of time at which the call reception request message is transmitted, or may be a specific point of time before the response message is received after the call reception request message is transmitted. Alternatively, the start point of time at which the information for generating the preliminary message is obtained may be a specific point of time that is randomly determined by a user. However, the scope of the present invention is not limited to the aforementioned points of time. The same principle applies to the embodiments of FIG. 28.

The end point of time at which the information for generating the preliminary message is obtained may be a specific point of time before the early media session is established after the response message is received in FIG. 27(*a*), or may be a point of time after the call outgoing procedure is terminated in FIG. 27(*b*). Furthermore, the end point of time at which the information for generating the preliminary message is obtained may be a specific point of time that is randomly determined by a user. However, the scope of the present invention is not limited to the aforementioned point of times. The same principle applies to the embodiments of FIG. 28.

Figure 28:
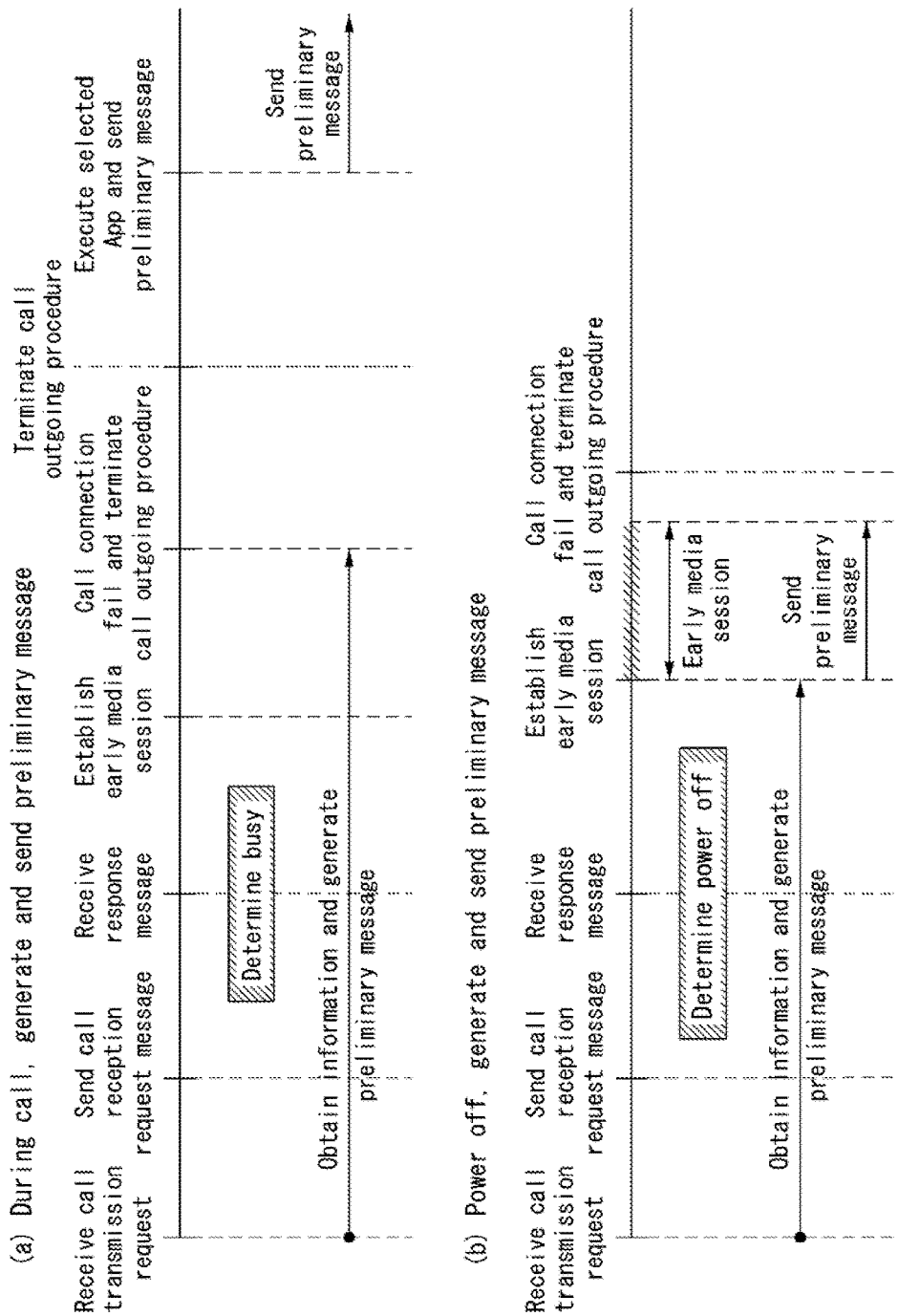
FIG. 28 illustrates examples in which a preliminary message is generated and transmitted when a called device is busy or the power of the called device is off in the method of driving the mobile terminal shown in FIG. 24.

FIG. 28 illustrates examples in which a preliminary message is generated and transmitted when a called device is busy or the power of the called device is off in the method of driving the mobile terminal shown in FIG. 24.

Referring to FIG. 28(*a*), when a call transmission request from a user is received, the controller 180 sends a call reception request message to a called device. Thereafter, the mobile terminal 100 receives a response message corresponding to the call reception request message. The controller 180 starts obtaining information for generating a preliminary message after the call transmission request.

Furthermore, the controller 180 analyzes data included in the response message and determines that the called device is busy based on a result of the analysis. Thereafter, the call outgoing procedure is terminated. In this case, the controller 180 generates a preliminary message based on information obtained through the information acquisition means until the call outgoing procedure is terminated.

Thereafter, the controller 180 provides a user interface for selecting an application used to send the preliminary message, and sends the generated preliminary message to the called device by executing the application selected by the user in the user interface.

Referring to FIG. 28(*b*), a call transmission request from a user is received. In response thereto, the controller 180 starts obtaining information for generating a preliminary message. Thereafter, the controller 180 sends a call reception request message to a called terminal and receives a response message corresponding to the call reception request message.

In response to the response message, the controller 180 analyzes data included in the response message, and determines that the power of the called device is off based on a result of the analysis. In this case, the controller 180 generates the preliminary message based on information obtained through the information acquisition means until an early media session is established, and sends the generated preliminary message to the called dev using a data section assigned to the early media session.

FIG. 29 illustrates an example in which a generated preliminary message is displayed in a speech bubble form in the mobile terminal 100 according to an embodiment of the present invention.

FIG. 29(a) illustrates that the voice of a user is obtained through the microphone 122, and FIG. 29(b) illustrates that a preliminary message generated based on the obtained voice of the user is displayed on the display module 151 of the mobile terminal 100.

From FIG. 29(b), it may be seen that the controller 180 of the mobile terminal 100 separates the obtained voice of the user based on syllables and displays the separated voices in the form of a plurality of speech bubbles. However, the display form of the preliminary message separated into a plurality of parts is not limited to the aforementioned speech bubble form.

Figure 30:
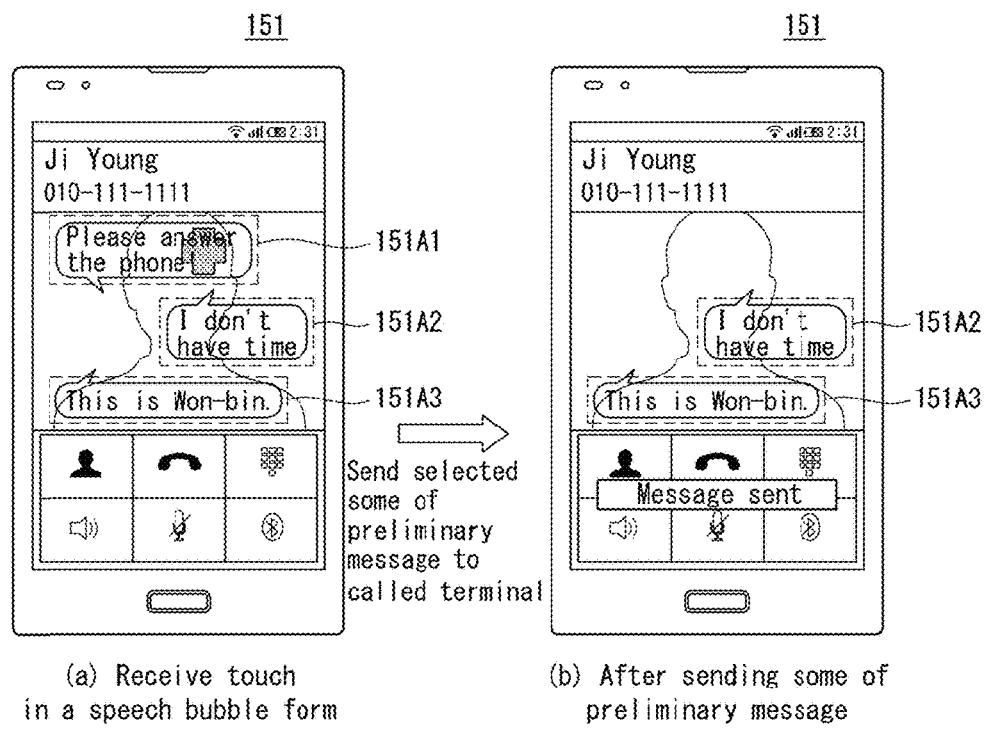
FIG. 30 illustrates an example in which some of a preliminary message that has been divided into a plurality of parts and displayed is selected and transmitted in the mobile terminal according to an embodiment of the present invention.

FIG. 30 illustrates an example in which some of a preliminary message that has been divided into a plurality of parts and displayed is selected and transmitted in the mobile terminal 100 according to an embodiment of the present invention.

FIG. 30(a) illustrates that a preliminary message generated based on the voice of a user is displayed in the form of a plurality of speech bubbles 151A1, 151A2, and 151A3. In FIG. 30(a), a single speech bubble 151A1 is selected by the touch of the user. In response thereto, the controller 180 of the mobile terminal 100 sends some of the preliminary message, corresponding to the selected speech bubble 151A1, to a called terminal.

FIG. 30(b) illustrates that some of the transmitted preliminary message is not displayed on the display module 151 of the mobile terminal 100.

Figure 31:
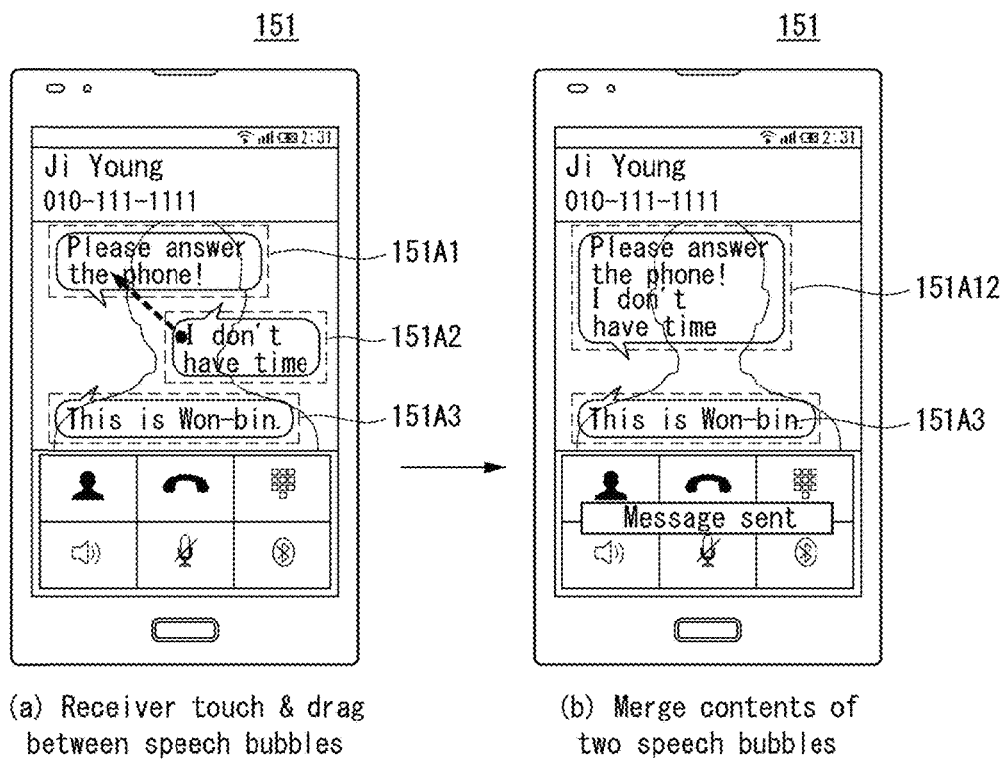
FIG. 31 illustrates an example in which a preliminary message that has been divided into a plurality of parts and displayed is merged in the mobile terminal according to an embodiment of the present invention.

FIG. 31 illustrates an example in which a preliminary message that has been divided into a plurality of parts and displayed is merged in the mobile terminal 100 according to an embodiment of the present invention.

FIG. 31(a) illustrates that in the state in which a preliminary message is displayed in the form of a plurality of speech bubbles, a touch & drag from a first part preliminary message 151A1 to a second part preliminary message 151A2 is received.

From FIG. 31(b), it may be seen that the controller of the mobile terminal 100 displays the first and the second part preliminary messages along with a single speech bubble 151A12. As in the example of FIG. 30, when a user touches the speech bubble 151A12 in which the merged messages are displayed, the merged messages may be sequentially transmitted to a called terminal.

Figure 32:
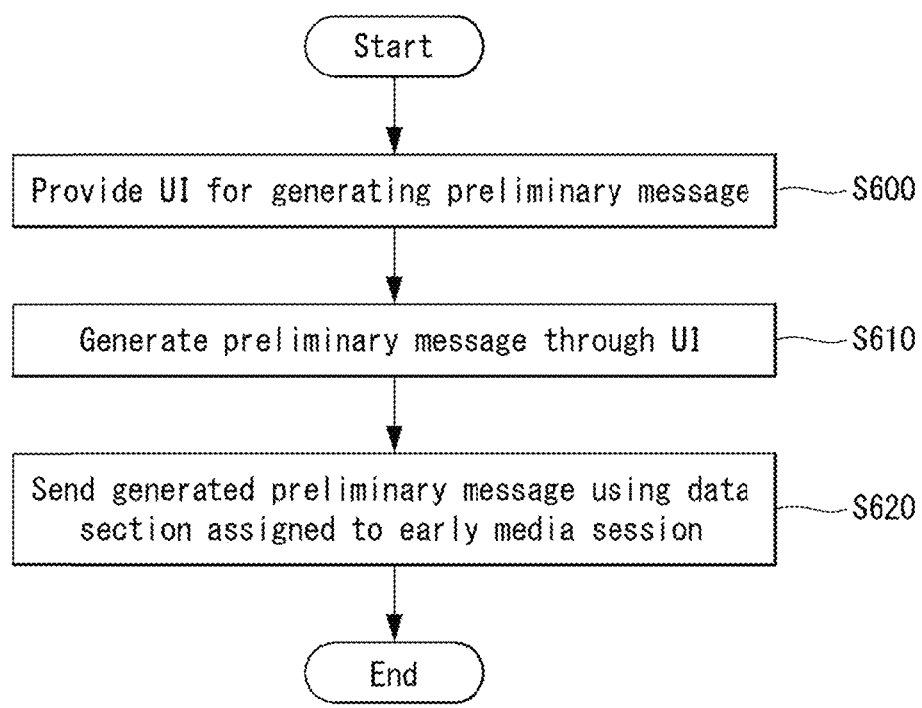
FIG. 32 is a flowchart illustrating still yet another example of a method of driving the mobile terminal according to an embodiment of the present invention.

FIG. 32 is a flowchart illustrating still yet another example of a method of driving the mobile terminal 100 according to an embodiment of the present invention. The method of driving the mobile terminal is described below with reference to required drawings.

The controller 180 of the mobile terminal 100 provides a user interface for generating a preliminary message through the display module 151 at step S600. A point of time at which the user interface is provided may be before a call transmission request from a user is received, or may be a point of time at which a call outgoing procedure is in progress after a call transmission request is received.

A preliminary message is generated through the user interface at step S610. The generation of the preliminary message through the user interface may be performed in response to input through a virtual keypad through the display module 151 implemented of a touch screen, or may be performed in such a manner that preliminary messages previously stored in the memory 160 are provided through the display module 151 and a user selects at least one of the preliminary messages. However, a method of generating a preliminary message through the user interface in the mobile terminal 100 according to an embodiment of the present invention is not limited to the aforementioned examples.

The controller 180 may send the generated preliminary message to a called device using a data section assigned to an early media session that is established before a communication channel with the called device is formed at step S620.

Figure 33:
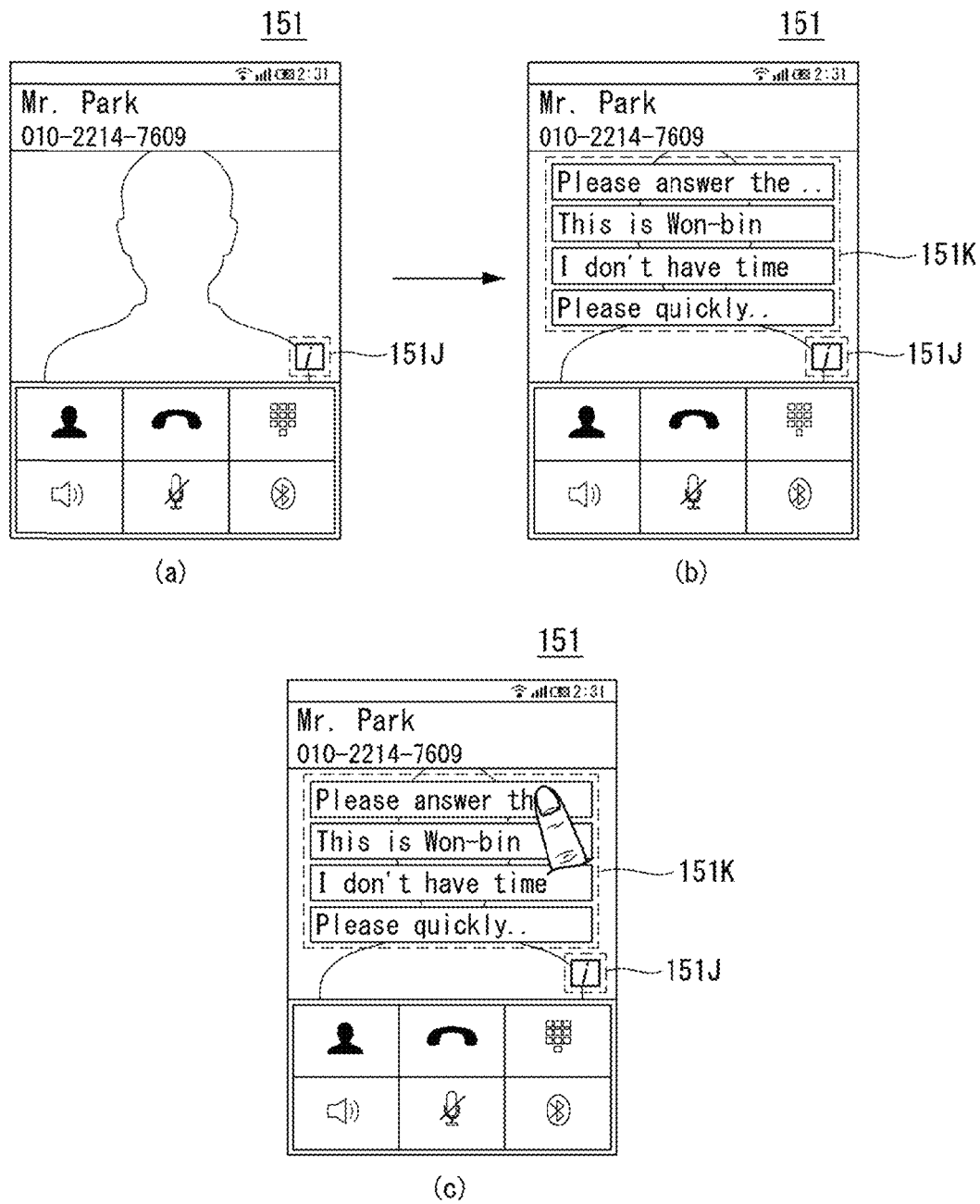
FIG. 33 illustrates an example in which a preliminary message is generated in the method of driving the mobile terminal shown in FIG. 32.

FIG. 33 illustrates an example in which a preliminary message is generated in the method of driving the mobile terminal 100 shown in FIG. 32.

FIG. 33(a) illustrates that after a call reception request message is transmitted to a called device, a user touches a specific icon displayed on the touch screen 151. In response thereto, the controller 180 displays a preliminary message list 151K that has been previously transmitted on the touch screen 151, as illustrated in FIG. 33(b). The controller 180 may display the preliminary message list on the touch screen 151 in response to a voice command, a specific word, or the manipulation of a specific button.

When a user selects any one preliminary message of the preliminary message list 151K by touching the message as illustrated in FIG. 33(c), the controller 180 may send the selected preliminary message to a called device. The preliminary message list displayed on the touch screen 151 may be a preliminary message list that has not been previously transmitted, but has been previously generated and stored by the user.

Figure 34:
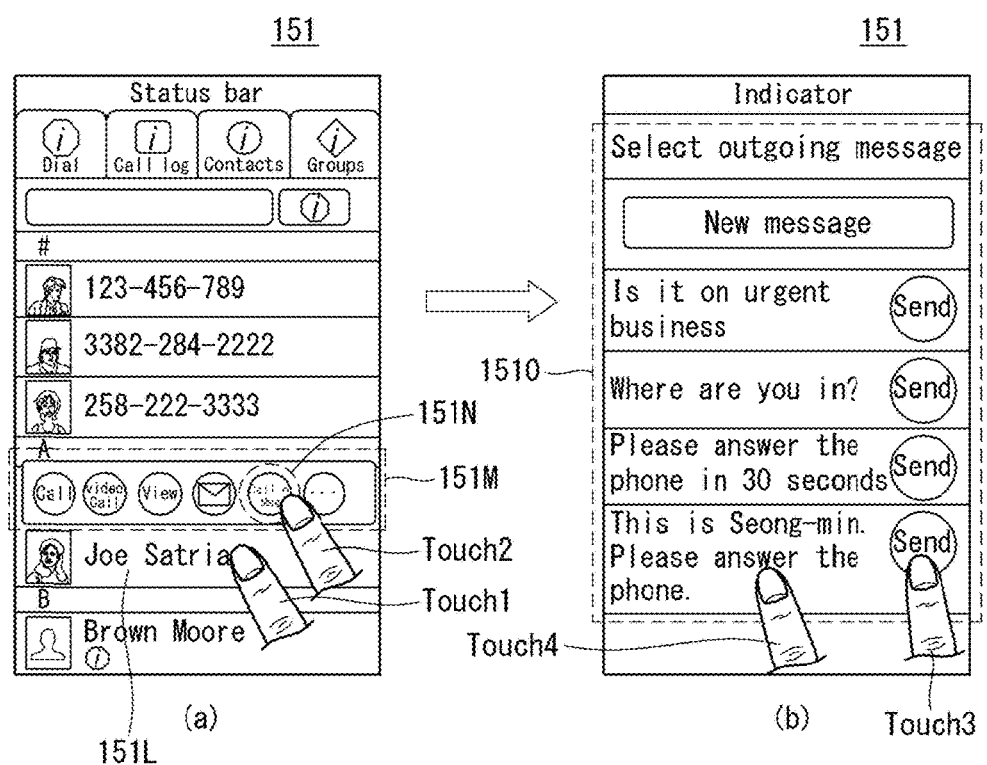
FIGS. 34 and 35 illustrate another example in which a preliminary message is generated in the method of driving the mobile terminal shown in FIG. 32.
Figure 35:
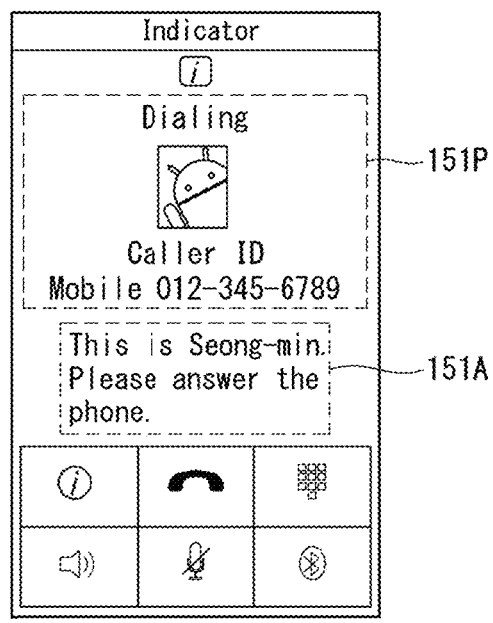

FIGS. 34 and 35 illustrate another example in which a preliminary message is generated in the method of driving the mobile terminal 100 shown in FIG. 32.

When a user touches specific contact information 151L in a screen in which a contact information application is executed before a call transmission request from the user is received, the controller 180 displays a user interface 151M for selecting a function that may be performed using the specific contact information on the touch screen 151.

The user selects an item 151N corresponding to a function for sending a preliminary message in the user interface 151M by touching the item 151N. In response thereto, the controller 180 displays a preliminary message list 151O that has been previously transmitted on the touch screen 151, as illustrated in FIG. 34(b).

When a touch 3 for selecting any one preliminary message of the preliminary message list and sending the selected preliminary message is received, the controller 180 may display call outgoing information 151P while sending a call reception request message, and simultaneously may send a selected preliminary message 151A to a called device as illustrated in FIG. 35. In this case, the controller 180 may send the selected preliminary message 151A using a data section assigned to an early media session. Furthermore, after a call is connected, the controller 180 may send the selected preliminary message to the called device using a data section assigned to a billing region.

When a touch 4 on a region in which the contents of a specific preliminary message are displayed is received from the user as illustrated in FIG. 34(b), the controller 180 may provide a user interface for editing the specific preliminary message.

Figure 36:
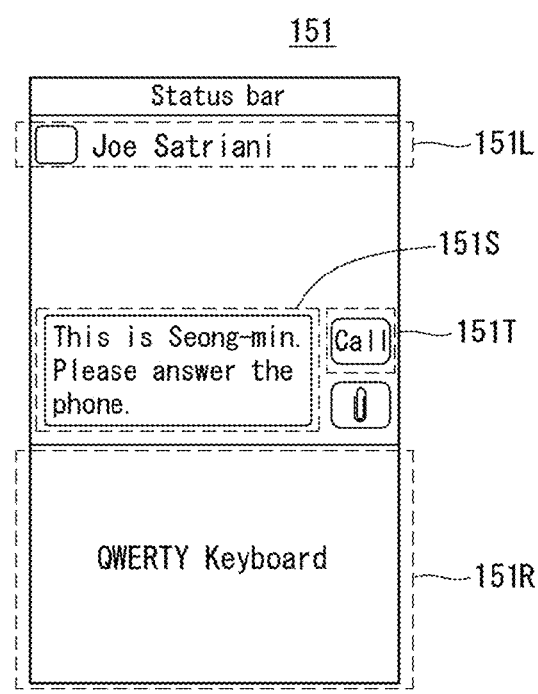
FIG. 36 illustrates yet another example in which a preliminary message is generated in the method of driving the mobile terminal shown in FIG. 32.

FIG. 36 illustrates yet another example in which a preliminary message is generated in the method of driving the mobile terminal shown in FIG. 32.

From FIG. 36, it may be seen that the controller 180 of the mobile terminal 100 may provide a user interface for directly writing a preliminary message based on a user manipulation. More specifically, in the state in which specific contact information 151L has been selected, a user may write a preliminary message using a virtual keyboard 151R provided through the touch screen 151. The message input through the virtual keyboard is displayed on an input window 151S. The user may execute a function for sending a call transmission request and the preliminary message by touching a send button 151T.

Figure 37:
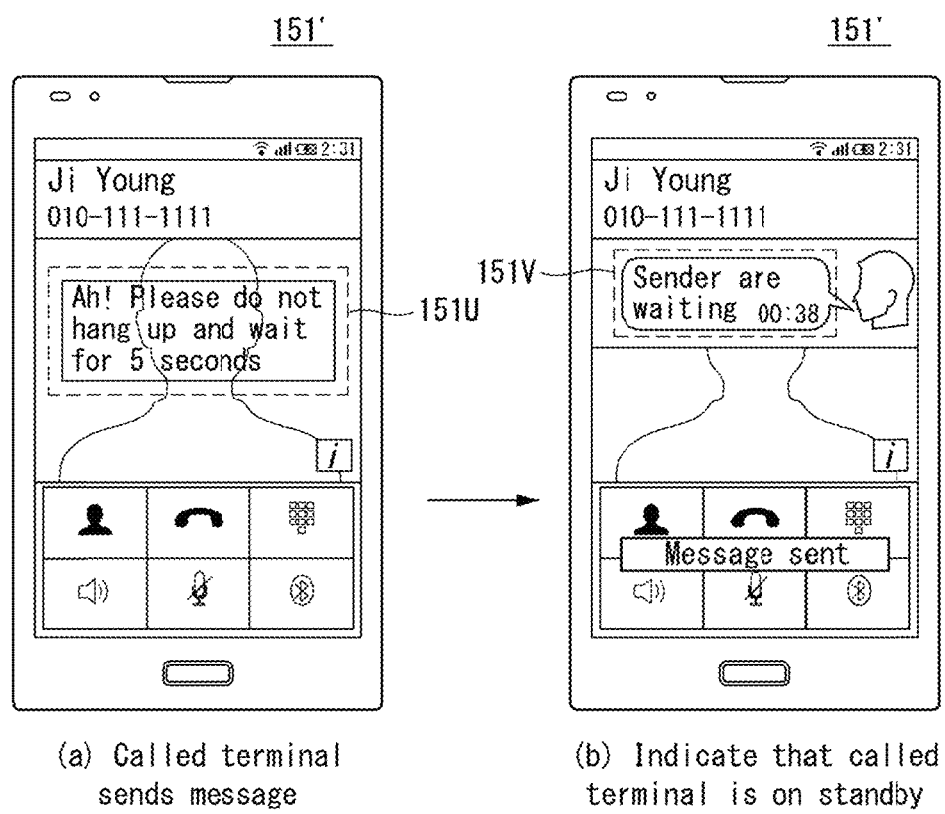
FIG. 37 illustrates an example in which a called terminal sends a response message for a preliminary message received from a calling terminal.

FIG. 37 illustrates an example in which a called terminal 100 sends a response message for a preliminary message received from a calling terminal.

FIG. 37(a) illustrates that a called party has generated a response message 151U for a received preliminary message and has sent the generated response message 151U to a calling terminal before a call was connected. In this case, the response message 151U may have been generated based on the voice of the called party like a preliminary message, may have been selected from previously stored messages, or may have been directly input by a user.

FIG. 37(b) illustrates that the response message has been transmitted to the calling terminal and a message 151V indicative that the calling party is on standby is displayed on the touch screen 151' of the calling terminal.

Figure 38:
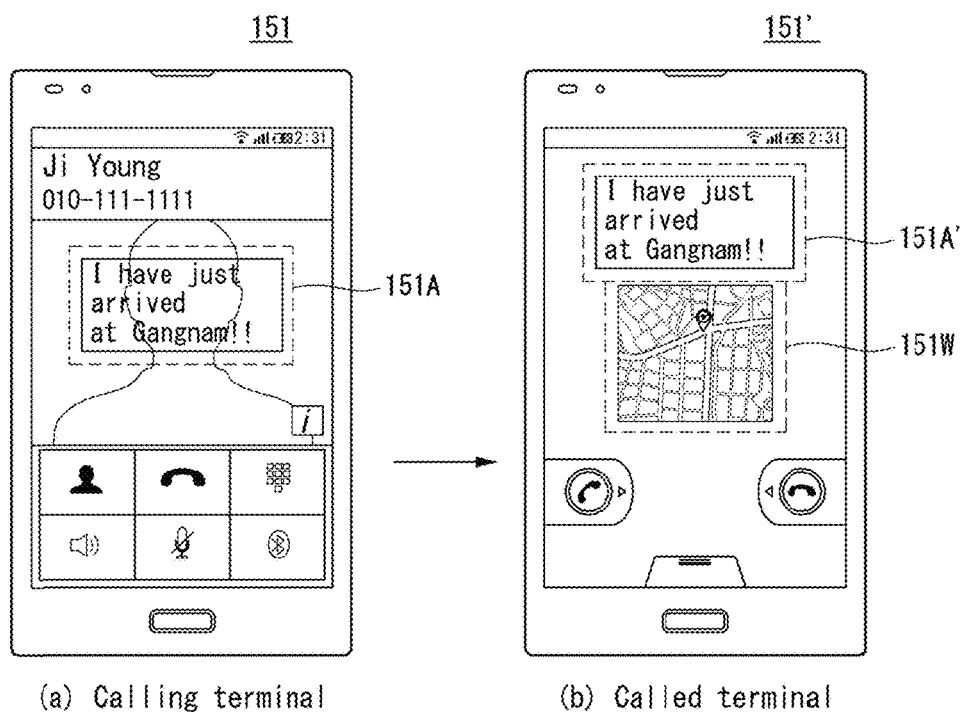
FIG. 38 illustrates an example in which information corresponding to a result of the analysis of a preliminary message, together with the preliminary message, is transmitted to a calling terminal in the mobile terminal according to an embodiment of the present invention.

FIG. 38 illustrates an example in which information corresponding to a result of the analysis of a preliminary message, together with the preliminary message, is transmitted to a calling terminal 100 in the mobile terminal 100 according to an embodiment of the present invention.

FIG. 38(a) illustrates that a preliminary message indicative that a calling party has reached a specific location "Gangnam" has been transmitted to a called terminal. Although not displayed on the display module 151 of the calling terminal 100, the controller 180 of the mobile terminal 100 analyzes the preliminary message, and sends data for displaying a map in which the location of the calling terminal has been displayed on the display module 151' of the called terminal, that is, information corresponding to a result of the analysis, to the called device.

FIG. 38(b) illustrates the display module 151 of the called device. From FIG. 38(b), it may be seen that map information 151W corresponding to a result of the analysis, together with a preliminary message 151' received from the calling terminal, are displayed on the display module 151.

Figure 39:
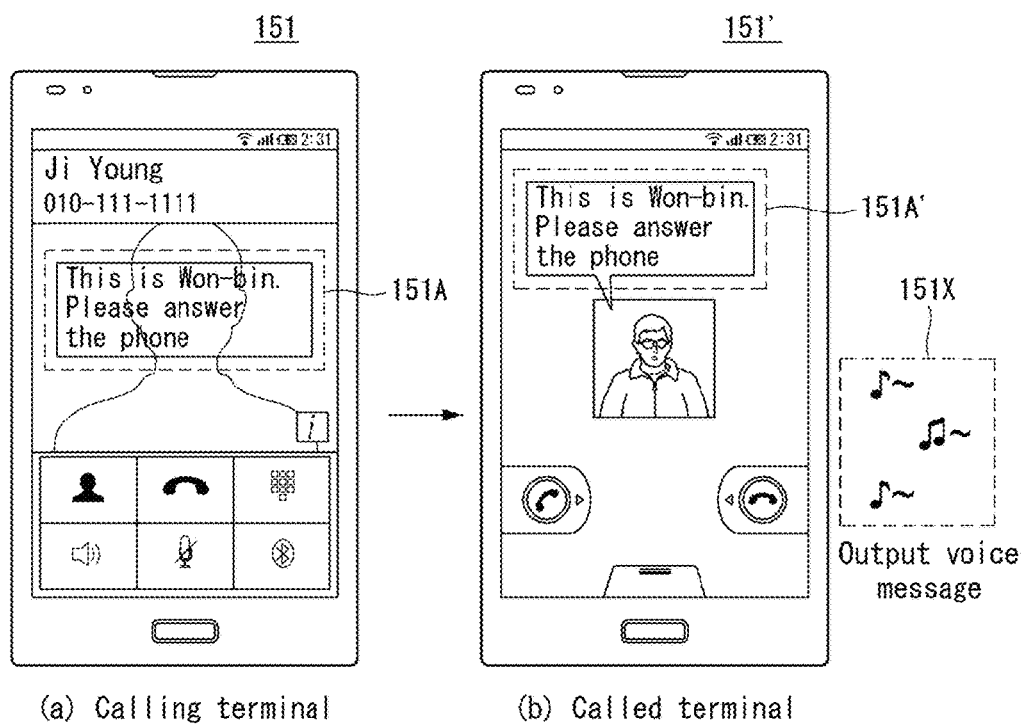
FIG. 39 illustrates that a preliminary message transmitted by the mobile terminal according to an embodiment of the present invention is output in the form of a voice message in a called terminal.

FIG. 39 illustrates that a preliminary message transmitted by the mobile terminal 100 according to an embodiment of the present invention is output in the form of a voice message in a called terminal.

FIG. 39(a) illustrates that the mobile terminal 100, that is, a calling terminal, has sent a preliminary message 151A. FIG. 39(b) illustrates that a preliminary message 151A' is received and displayed on a called terminal and the received preliminary message is output in the form of a voice message 151X.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A mobile terminal, comprising:
a wireless communication unit configured to communicate with an external device;
an input unit comprising a microphone configured to capture audio information; and
a controller configured to:
generate a call reception request message in response to a call transmission command;
send the generated call reception request message to the external device via the wireless communication unit;

generate a preliminary message comprising information captured via the input unit before a call related to the call reception request message is connected with the external device; and send the generated preliminary message to the external device via the wireless communication unit, wherein the generated preliminary message comprises a voice message related to the audio information or a text message comprising words recognized in the voice message;

further comprising a display, wherein the controller is further configured to cause the display to display a user interface for selecting an application for sending the preliminary message when the call is not connected.

2. The mobile terminal of claim 1, wherein at least:

the input unit further comprises a keyboard configured to receive text input and the generated preliminary message comprises a text message received via the keyboard; or the input unit further comprises a camera configured to capture images and the generated preliminary message comprises an image captured by the camera.

3. The mobile terminal of claim 2, wherein the controller is further configured to change a size of text of the text message based on a volume of the voice message related to the captured audio information.

4. The mobile terminal of claim 3, wherein the controller is further configured to:

select an image stored in a memory based on content of the text message; and generate a preliminary message comprising the text message and the selected image.

5. The mobile terminal of claim 1, wherein the controller is further configured to:

cause the display to display an application list comprising applications each executed in response to a selection input; and change the applications displayed in the application list based on information associated with the external device.

6. The mobile terminal of claim 1, wherein the controller is further configured to send the preliminary message to the external device using a specific application when the call is not connected.

7. The mobile terminal of claim 1, wherein the controller is configured to generate information for generating the preliminary message when:

audio related to a voice of a user is received via the input unit;

a word is recognized in the received audio; or a specific manipulation is received via the input unit.

8. The mobile terminal of claim 1, wherein the controller is further configured to include the preliminary message sent to the external device in a call history log associated with the external device.

9. The mobile terminal of claim 1, wherein the controller is further configured to send the preliminary message using a data section assigned to an early media session established before the call is connected.

10. The mobile terminal of claim 9, wherein the controller is further configured to:

reduce a size of the generated preliminary message to be smaller than a size of the data section assigned to the early media session; and send the reduced size preliminary message to the external device via the wireless communication unit.

11. A mobile terminal, comprising:

a wireless communication unit configured to communicate with an external device;

an input unit comprising a microphone configured to capture audio information; and a controller configured to:

generate a call reception request message in response to receiving a call transmission command;

send the generated call reception request message to the external device via the wireless communication unit;

determine an operating state of the external device based on a response message received in response to the sent call reception request message;

cause the input unit to capture input information for a specific time duration; generate a preliminary message comprising the captured input information; and send the preliminary message to the external device via the wireless communication unit at a specific time based on the determined operating state of the external device, wherein the generated preliminary message comprises a voice message related to the audio information or a text message comprising words recognized in the voice message;

further comprising a display, wherein when the determined operating state is a state in which the external device is busy:

the specific time duration begins after receiving the call transmission command and ends when a call outgoing procedure is terminated; and the controller is further configured to cause the display to display a user interface for selecting an application for sending the preliminary message to the external device.

12. The mobile terminal of claim 11, wherein when the determined operating state is a state in which the external device is available to receive calls or is a state in which the external device is busy:

the specific time duration begins after receiving the call transmission command and ends when an early media session is established; and the generated preliminary message is sent to the external device via the wireless communication unit using a data section assigned to the early media session.

13. The mobile terminal of claim 11, wherein when the determined operating state is a state in which the external device is off:

the specific time duration begins after receiving the call transmission command and ends when an early media session is established; and the generated preliminary message is sent to the external device via the wireless communication unit using a data section assigned to the early media session.

14. The mobile terminal of claim 11, further comprising a display, wherein when the determined operating state is a state in which the external device is off:

the specific time duration begins after receiving the call transmission command and ends when a call outgoing procedure is terminated; and the controller is further configured to cause the display to display a user interface for selecting an application for sending the preliminary message to the external device.

15. The mobile terminal of claim 14, wherein the controller is further configured to:

cause the display to display an application list comprising applications each executed in response to a selection input, and change the applications in the displayed application list based on information associated with the external device.

16. The mobile terminal of claim 11, wherein the controller is further configured to include the preliminary message sent to the external device in a call history log associated with the external device.

\* \* \* \* \*